US012638635B2

(12) United States Patent
Liu et al.

(10) Patent No.: US 12,638,635 B2
(45) Date of Patent: May 26, 2026

(54) MULTI-TIERED SEMICONDUCTOR WAVEGUIDE AND MULTI-TIERED WAVEGUIDE HEATER

(71) Applicant: Taiwan Semiconductor Manufacturing Company, Ltd., Hsinchu (TW)

(72) Inventors: Wei-Kang Liu, Taichung City (TW); Hau-Yan Lu, Hsinchu City (TW); Ying Kit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 470 days.

(21) Appl. No.: 18/194,779

(22) Filed: Apr. 3, 2023

(65) Prior Publication Data

US 2024/0329298 A1 Oct. 3, 2024

(51) Int. Cl.
G02B 6/12 (2006.01)
G02F 1/025 (2006.01)

(52) U.S. Cl.
CPC ......... G02B 6/12002 (2013.01); G02F 1/025 (2013.01); *G02B 2006/12135* (2013.01); *G02B 2006/12176* (2013.01)

(58) Field of Classification Search
CPC .............................. G02B 6/12002; G02F 1/025
See application file for complete search history.

(56) References Cited

U.S. PATENT DOCUMENTS

| | | | |
|---|---|---|---|
| 10,509,244 B1 | 12/2019 | Shank et al. | |
| 10,908,440 B1 * | 2/2021 | Wood .................... | G02F 1/0102 |
| 2012/0087613 A1 | 4/2012 | Rasras | |
| 2017/0351124 A1 * | 12/2017 | Roth .................... | G02F 1/0121 |
| 2018/0331498 A1 | 11/2018 | Evans et al. | |
| 2020/0150344 A1 | 5/2020 | Jayatilleka et al. | |
| 2020/0209655 A1 | 7/2020 | Roth et al. | |
| 2021/0294130 A1 | 9/2021 | Lin et al. | |
| 2021/0333575 A1 | 10/2021 | Hu et al. | |
| 2022/0299704 A1 * | 9/2022 | Oh ........................ | H01S 5/0261 |

FOREIGN PATENT DOCUMENTS

TW 202117375 A 5/2021

* cited by examiner

*Primary Examiner* — Tina Wong
(74) *Attorney, Agent, or Firm* — Eschweiler & Potashnik, LLC

(57) ABSTRACT

An integrated chip including a base dielectric layer and a multi-tiered semiconductor waveguide layer over the base dielectric layer. The multi-tiered semiconductor waveguide layer has a first waveguide tier having a first width at a first height over the base dielectric layer. The multi-tiered semiconductor waveguide layer has a second waveguide tier having a second width, greater than the first width, at a second height, less than the first height, over the base dielectric layer. A cladding layer is over the multi-tiered semiconductor waveguide layer. A multi-tiered conductive heater layer is over the cladding layer. The multi-tiered conductive heater layer has a first heater tier over the first waveguide tier. The multi-tiered conductive heater layer has a pair of second heater tiers at the first height, over the second waveguide tier, and on opposite sides of the first waveguide tier.

20 Claims, 15 Drawing Sheets

100a

600a

600b

1100

1200

1300

1400

1500

1600

1700

1800

1900 ⬊

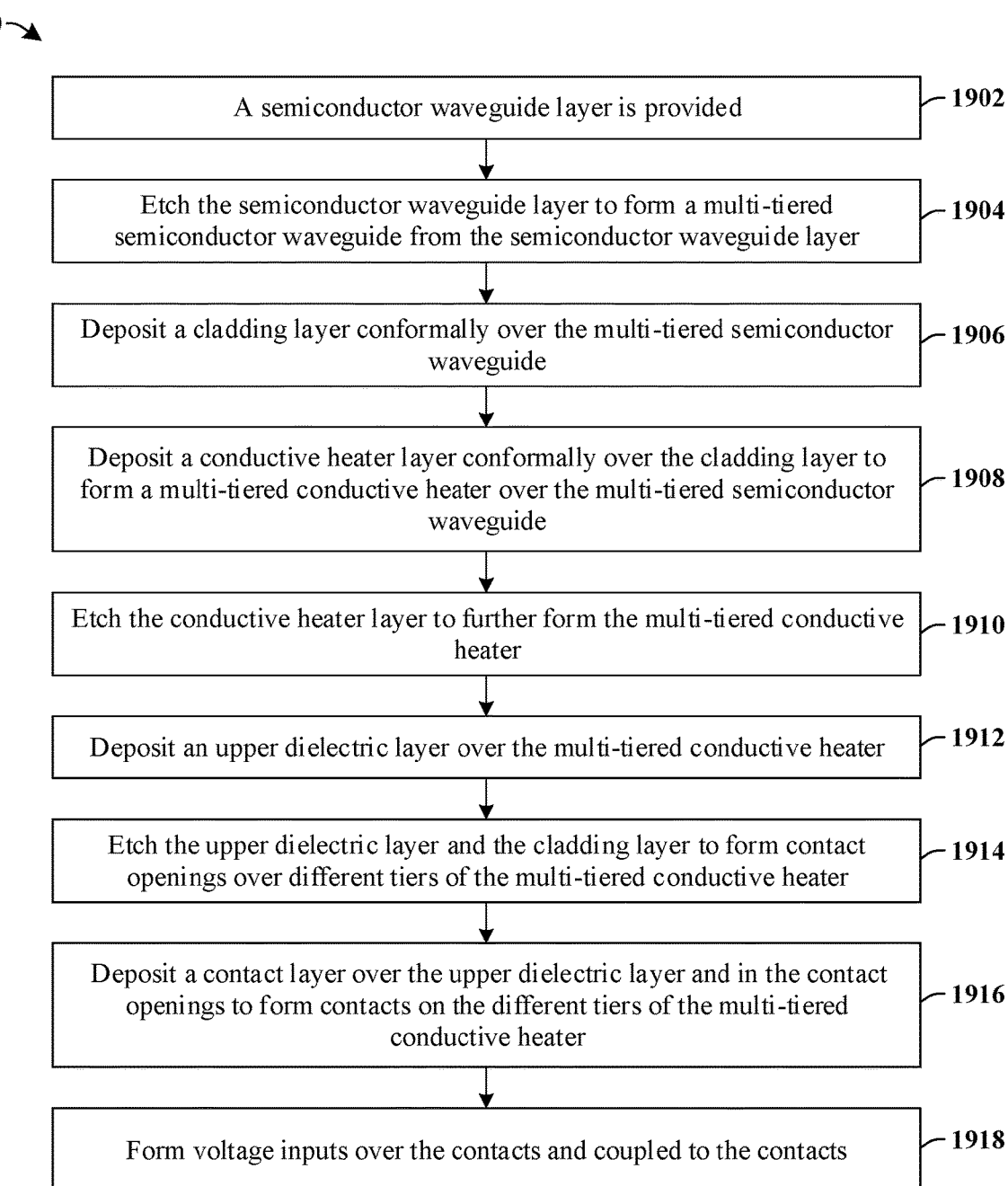

| | |
|---|---|
| A semiconductor waveguide layer is provided | 1902 |
| Etch the semiconductor waveguide layer to form a multi-tiered semiconductor waveguide from the semiconductor waveguide layer | 1904 |
| Deposit a cladding layer conformally over the multi-tiered semiconductor waveguide | 1906 |
| Deposit a conductive heater layer conformally over the cladding layer to form a multi-tiered conductive heater over the multi-tiered semiconductor waveguide | 1908 |
| Etch the conductive heater layer to further form the multi-tiered conductive heater | 1910 |
| Deposit an upper dielectric layer over the multi-tiered conductive heater | 1912 |
| Etch the upper dielectric layer and the cladding layer to form contact openings over different tiers of the multi-tiered conductive heater | 1914 |
| Deposit a contact layer over the upper dielectric layer and in the contact openings to form contacts on the different tiers of the multi-tiered conductive heater | 1916 |
| Form voltage inputs over the contacts and coupled to the contacts | 1918 |

Fig. 19

MULTI-TIERED SEMICONDUCTOR WAVEGUIDE AND MULTI-TIERED WAVEGUIDE HEATER

BACKGROUND

Optical waveguides are often used as components in integrated optical circuits. Optical waveguides are used to confine and guide light from a first point on an integrated chip (IC) to a second point on the IC with minimal attenuation. Many modern optical waveguides are formed using semiconductors. A semiconductor waveguide may include an optical converter or an optical coupler for optically coupling an optical fiber to the semiconductor waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 19 illustrates a flow diagram of some embodiments of a method for forming an integrated chip comprising a multi-tiered semiconductor waveguide and a multi-tiered conductive heater over the multi-tiered semiconductor waveguide.

DETAILED DESCRIPTION

Figure 1A:
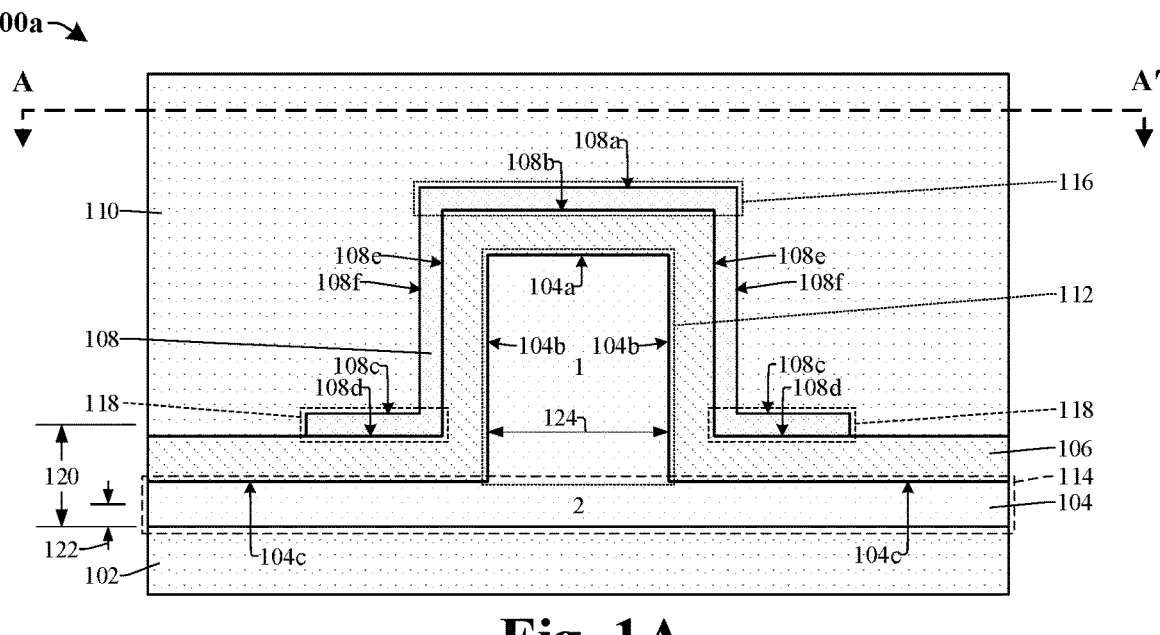
FIG. 1A and FIG. 1B illustrate cross-sectional views of some embodiments of an integrated chip comprising a multi-tiered conductive heater layer over a multi-tiered semiconductor waveguide layer.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photonic integrated chip includes a semiconductor waveguide layer over a base dielectric layer. The semiconductor waveguide layer has a pair of sidewalls and an upper surface that form an optical waveguide. The upper surface extends between tops of the sidewalls. A cladding layer is over the semiconductor waveguide layer. A difference between the refractive index of the semiconductor waveguide layer and the cladding layer is substantially large so that optical radiation can be confined within the semiconductor waveguide layer. For example, in some instances the semiconductor waveguide layer comprises silicon and the cladding layer comprises silicon dioxide. However, silicon can be highly sensitive to temperature variation, which can reduce a performance of the semiconductor waveguide layer. For example, temperature variation along the semiconductor waveguide layer can cause variation in the phase of the optical signal(s) traveling within the optical waveguide. Thus, some integrated chips include a conductive heater layer over the semiconductor waveguide layer to improve a control of the temperature of the semiconductor waveguide layer. For example, by controlling an amount of current generated in the conductive heater layer, the temperature of the conductive heater layer can be controlled and hence the temperature of the semiconductor waveguide layer can be controlled. As a result, the performance of the semiconductor waveguide layer can be tuned. For example, the phase of the optical signal(s) traveling within the optical waveguide can be tuned.

The conductive heater layer is disposed over the upper surface of the semiconductor waveguide layer and is spaced apart from the upper surface of the semiconductor waveguide layer by the cladding layer. Thus, the conductive heater layer can control the temperature of semiconductor waveguide layer along the upper surface of the semiconductor waveguide layer. However, the conductive heater layer does not extend below the upper surface of the semiconductor waveguide layer alongside the sidewalls of the semiconductor waveguide layer. Thus, a control of the temperature of the semiconductor waveguide layer along the sidewalls of the semiconductor waveguide layer may be reduced.

In various embodiments of the present disclosure, the conductive heater layer has a multi-tiered structure to increase the control of the temperature of the semiconductor waveguide layer. For example, the multi-tiered conductive heater layer has a first heater tier extending laterally over the upper surface of the semiconductor waveguide layer. Further, the multi-tiered conductive heater layer has a pair of second heater tiers below the upper surface of the semiconductor waveguide layer, on opposite sides of the upper surface of the semiconductor waveguide layer, and extending laterally away from the sidewalls of the semiconductor waveguide layer, respectively. The conductive heater layer extends vertically from the first heater tier to the pair of second heater tiers respectively on opposite sides of the upper surface of the semiconductor waveguide layer.

Because the conductive heater layer has the multi-tiered structure, the conductive heater layer extends over the upper surface of the semiconductor waveguide layer and below the upper surface alongside the sidewalls of the semiconductor waveguide layer. Thus, a control of the temperature of the semiconductor waveguide layer along the sidewalls of the semiconductor waveguide layer can be improved. By improving the control of the temperature of the semiconductor waveguide layer, a control of the performance of the waveguide can be improved. For example, the control of the phase of the optical signal(s) traveling within the optical waveguide can be improved.

FIG. 1A illustrates a cross-sectional view 100a of some embodiments of an integrated chip comprising a multi-tiered conductive heater layer 108 over a multi-tiered semiconductor waveguide layer 104.

The semiconductor waveguide layer 104 is over a base dielectric layer 102. The semiconductor waveguide layer 104 has a plurality of waveguide tiers having different widths at different heights over the base dielectric layer 102. For example, the semiconductor waveguide layer 104 has a first waveguide tier 112 over a second waveguide tier 114 (e.g., a waveguide base). The first waveguide tier 112 has a first width 124 at a first height 120 over the base dielectric layer 102. The second waveguide tier 114 has a second width (not labeled), greater than the first width 124, at a second height 122, less than the first height 120, over the base dielectric layer 102.

The first waveguide tier 112 is formed (e.g., delimited) by a first upper surface 104a of the semiconductor waveguide layer 104 and a pair of first sidewalls 104b of the semiconductor waveguide layer 104 that are on opposite sides of the first upper surface 104a. The first upper surface 104a extends between tops of the first sidewalls 104b. The first upper surface 104a and the first sidewalls 104b form (e.g., delimit) an optical waveguide.

The second waveguide tier 114 extends laterally beyond the first sidewalls 104b of the semiconductor waveguide layer 104. The second waveguide tier 114 is formed (e.g., delimited), at least in part, by a pair of second upper surfaces 104c of the semiconductor waveguide layer 104. The second upper surfaces 104c are below the first upper surface 104a and on opposite sides of the first upper surface 104a. The second upper surfaces 104c extend laterally from the first sidewalls 104b. In some embodiments, the second upper surfaces 104c further form the optical waveguide.

A cladding layer 106 is over the semiconductor waveguide layer 104. The cladding layer 106 extends directly between the semiconductor waveguide layer 104 and the conductive heater layer 108. Thus, the semiconductor waveguide layer 104 is spaced apart from the conductive heater layer 108 by the cladding layer 106. A first upper dielectric layer 110 is over the conductive heater layer 108 and the cladding layer 106.

The conductive heater layer 108 is over the semiconductor waveguide layer 104. The conductive heater layer 108 has a plurality of heater tiers at different heights over the base dielectric layer 102. For example, the conductive heater layer 108 has a first heater tier 116 and a pair of second heater tiers 118 below the first heater tier 116.

The first heater tier 116 is over the first waveguide tier 112. For example, the first heater tier 116 is directly over the first upper surface 104a of the semiconductor waveguide layer 104. The first heater tier 116 extends laterally from over the first upper surface 104a to beyond the first sidewalls 104b of the semiconductor waveguide layer 104. The first heater tier 116 is formed (e.g., delimited), at least in part, by a first upper surface 108a and a first lower surface 108b of the conductive heater layer 108.

The pair of second heater tiers 118 are at the first height 120, over the second waveguide tier 114, and on opposite sides of the first waveguide tier 112. For example, the second heater tiers 118 are below and on opposite sides of the first upper surface 104a of the semiconductor waveguide layer 104, respectively. The second heater tiers 118 extend laterally away from the first sidewalls 104b of the semiconductor waveguide layer 104. The second heater tiers 118 are formed (e.g., delimited), at least in part, by a pair of second upper surfaces 108c and a pair of second lower surfaces 108d of the conductive heater layer 108.

The conductive heater layer 108 extends vertically alongside the first sidewalls 104b of the semiconductor waveguide layer 104 from the first heater tier 116 to the pair of second heater tiers 118, respectively. In particular, a first pair of inner sidewalls 108e of the conductive heater layer 108 extend from the first lower surface 108b to the pair of second lower surfaces 108d on opposite sides of the first upper surface 104a of the semiconductor waveguide layer 104. A first pair of outer sidewalls 108f of the conductive heater layer 108 extend from the first upper surface 108a to the pair of second upper surfaces 108c on opposite sides of the first upper surface 104a of the semiconductor waveguide layer 104.

Because the conductive heater layer 108 has the multi-tiered structure, the conductive heater layer 108 extends over the first upper surface 104a of the semiconductor waveguide layer 104, alongside the first sidewalls 104b of the semiconductor waveguide layer 104, and over the second upper surfaces 104c of the semiconductor waveguide layer 104. Thus, a control of the temperature of the semiconductor waveguide layer 104 along the various surfaces of the semiconductor waveguide layer 104 can be improved. As a result, a control of the performance of the waveguide can be improved. For example, a control of a phase of optical signal(s) traveling within the optical waveguide can be improved. In addition, because the conductive heater layer 108 extends over the first upper surface 104a of the semiconductor waveguide layer 104, alongside the first sidewalls 104b of the semiconductor waveguide layer 104, and over the second upper surfaces 104c of the semiconductor waveguide layer 104, the semiconductor waveguide layer 104 may be heated more quickly and thus more efficiently.

Figure 1B:
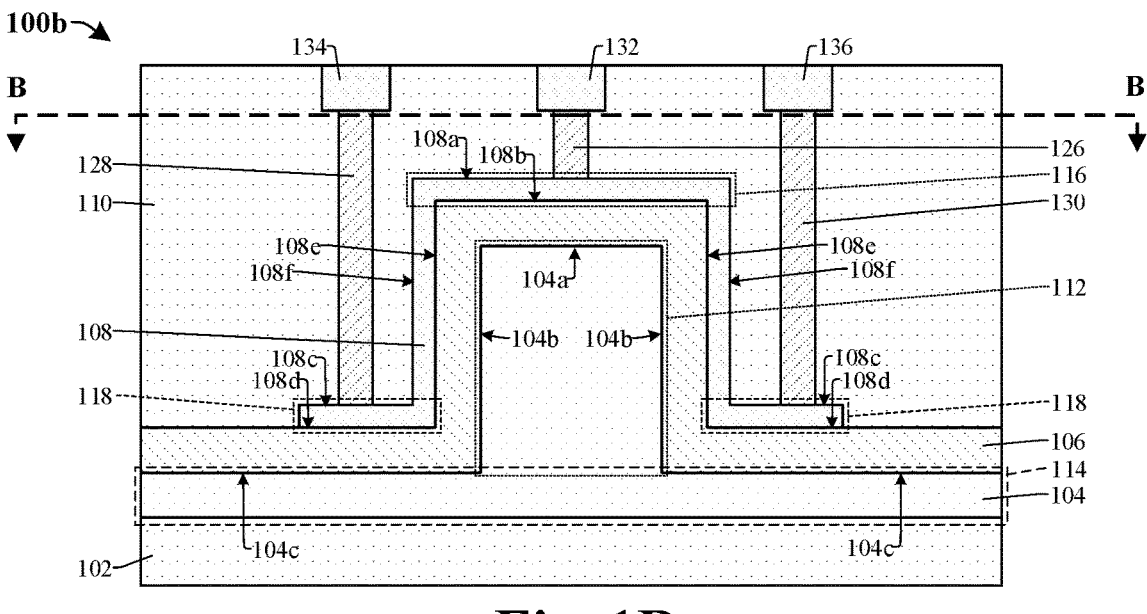
Figure 1C:
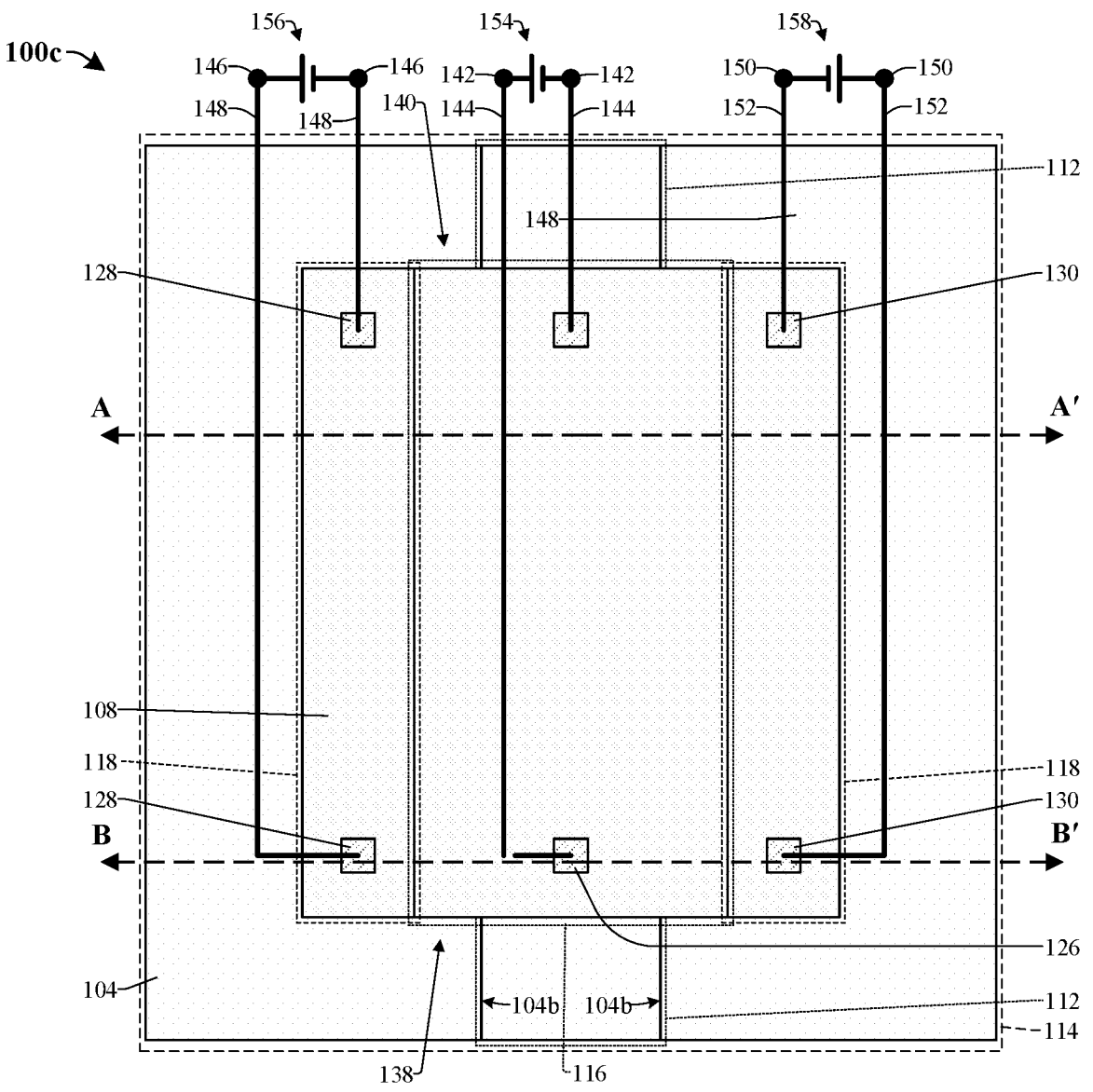
FIG. 1C illustrates a top view of some embodiments of the integrated chip of FIG. 1A and FIG. 1B.

FIG. 1B illustrates another cross-sectional view 100b of some embodiments of the integrated chip of FIG. 1A. In some embodiments, cross-sectional view 100b of FIG. 1B may be taken across line B-B' of FIG. 1C. FIG. 1C illustrates a top view 100c of some embodiments of the integrated chip of FIG. 1A and FIG. 1B. The cladding layer 106 and the first upper dielectric layer 110 are not shown in FIG. 1C.

The integrated chip includes a plurality of contacts disposed over the conductive heater layer 108. The contacts extend through the first upper dielectric layer 110 to the conductive heater layer 108. For example, in some embodiments, the integrated chip includes a pair of first contacts 126, a pair of second contacts 128, and a pair of third contacts 130.

The pair of first contacts 126 contact the conductive heater layer 108 along the first heater tier 116 near opposite ends of the conductive heater layer 108. For example, one of the first contacts 126 contacts the conductive heater layer 108 along the first upper surface 108a of the conductive heater layer 108 near a first end 138 of the conductive heater layer 108. The other of the first contacts 126 contacts the conductive heater layer 108 along the first upper surface 108a of the conductive heater layer 108 near a second end 140 of the conductive heater layer 108, opposite the first end 138.

The pair of second contacts 128 and the pair of third contacts 130 contact the conductive heater layer 108 along the pair of second heater tiers 118 near opposite ends of the conductive heater layer. For example, one of the second contacts 128 contacts the conductive heater layer 108 along one of the pair of second upper surfaces 108c of the conductive heater layer 108 near the first end 138 of the conductive heater layer 108. The other of the second contacts 128 contacts the conductive heater layer 108 along the one of the pair of second upper surfaces 108c of the conductive heater layer 108 near the second end 140 of the conductive heater layer 108. One of the third contacts 130 contacts the conductive heater layer 108 along the other of the pair of second upper surfaces 108c of the conductive heater layer 108 near the first end 138 of the conductive heater layer 108. The other of the third contacts 130 contacts the conductive heater layer 108 along the other of the pair of second upper surfaces 108c of the conductive heater layer 108 near the second end 140 of the conductive heater layer 108.

In some embodiments, the pairs of contacts are coupled to different voltage inputs that are disposed over the contacts. For example, in some embodiments, the pair of first contacts 126 are coupled (e.g., as illustrated by lines 144 representing wiring such as, for example, metal lines, metal vias, or the like) to a pair of first voltage inputs 142. The pair of second contacts 128 are coupled (e.g., as illustrated by lines 148 representing wiring such as, for example, metal lines, metal vias, or the like) to a pair of second voltage inputs 146. The pair of third contacts 130 are coupled (e.g., as illustrated by lines 152 representing wiring such as, for example, metal lines, metal vias, or the like) to a pair of third voltage inputs 150. In some embodiments, the voltage inputs 142, 146, 150 may be or comprise solder bumps, bond pads, metal lines, metal contacts, or some other suitable conductive feature(s).

In some embodiments, the voltage inputs are adapted to be coupled to voltage supplies. For example, the pair of first voltage inputs 142 are adapted to be coupled to a first voltage supply 154, the pair of second voltage inputs 146 are adapted to be coupled to a second voltage supply 156, and the pair of third voltage inputs 150 are adapted to be coupled to a third voltage supply 158.

Voltage can be applied across the pairs of contacts via the respective pairs of voltage inputs to generate a current in the conductive heater layer 108. For example, the current may flow from the first end 138 of the conductive heater layer 108 to the second end 140 of the conductive heater layer 108. Generating the current in the conductive heater layer 108 causes the conductive heater layer 108 to heat up. By controlling the voltage(s) applied across the contacts, the magnitude of the current generated in the conductive heater layer 108 can be controlled and hence the temperature of the conductive heater layer 108 can be controlled.

In some embodiments, different voltages can be provided across the different pairs of contacts via the different voltage inputs. For example, a first voltage can be provided across the first pair of contacts 126 via the pair of first voltage inputs 142. A second voltage, different than the first voltage, can be provided across the pair of second contacts 128 via the pair of second voltage inputs 146. A third voltage, different than the first voltage and the second voltage, can be provided across the pair of third contacts 130 via the pair of third voltage inputs 150. The different voltages can be individually controlled to tune the temperature of the conductive heater layer 108 along the different tiers of the conductive heater layer 108 individually and hence tune the temperature of the semiconductor waveguide layer 104 along the different surfaces of the semiconductor waveguide layer 104 individually. By individually tuning the temperatures of the semiconductor along the individual surfaces of the conductive heater layer 108, a control of the performance of the optical waveguide can be further improved.

Top surfaces of the first contact 126, the second contact 128, and the third contact 130 are disposed at a common height (not labeled) over the base dielectric layer 102. The second contact 128 and the third contact 130 extend below a bottom surface of the first contact 126. For example, the first contact 126 extends to a first depth (not labeled) below a topmost surface (not labeled) of the first upper dielectric layer 110, and the second contact 128 and the third contact 130 extend to a second depth (not labeled) below the topmost surface of the first upper dielectric layer 110, the second depth being greater than the first depth.

A pair of first metal lines 132 are directly over and coupled to the pair of first contacts 126. A pair of second metal lines 134 are directly over and coupled to the pair of second contacts 128. A pair of third metal lines 136 are directly over and coupled to the pair of third contacts 130. The metal lines 132, 134, 136 are not shown in FIG. 1C for clarity of illustration.

In some embodiments, the base dielectric layer 102, the cladding layer 106, and/or the first upper dielectric layer 110 may, for example, comprise silicon dioxide or some other suitable material. In some embodiments, the thickness of the cladding layer 106 can be adjusted to adjust the distance between the conductive heater layer 108 and the semiconductor waveguide layer 104. In some embodiments, the semiconductor waveguide layer 104 may, for example, comprise silicon or some other suitable material. In some embodiments, the conductive heater layer 108 may, for example, comprise tungsten, titanium nitride, or some other suitable material. In some embodiments, the thickness of the conductive heater layer 108 can be adjusted to adjust the resistance of the conductive heater layer 108. In some embodiments, the contacts 126, 128, 130 may, for example, comprise tungsten or some other suitable material. In some embodiments, the metal lines 132, 134, 136 may, for example, comprise copper or some other suitable material. In some embodiments, the base dielectric layer 102 is over a semiconductor substrate (not shown).

Figure 2A:
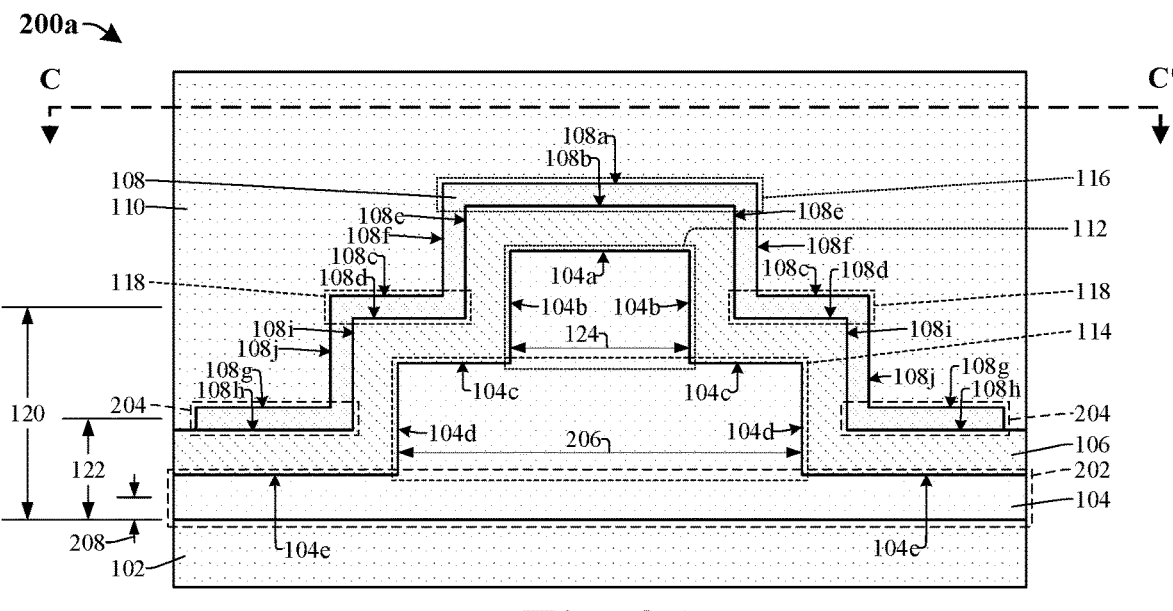
FIG. 2A and FIG. 2B illustrate cross-sectional views of some other embodiments of the integrated chip of FIG. 1A.

FIG. 2A illustrates a cross-sectional view 200a of some embodiments of the integrated chip of FIG. 1A in which the multi-tiered semiconductor waveguide layer 104 has a third waveguide tier 202 and the multi-tiered conductive heater layer 108 has a pair of third heater tiers 204. In some embodiments, cross-sectional view 200a of FIG. 2A may be taken across line C-C' of FIG. 2C.

The semiconductor waveguide layer 104 has a third waveguide tier 202 under the second waveguide tier 114. The first waveguide tier 112 has the first width 124 at the first height 120. The second waveguide tier 114 has a second width 206 at the second height 122. The third waveguide tier 110 has a third width (not labeled) at a third height 208 over the base dielectric layer 102. The third height 208 is less than the second height 122. The third width is greater than the second width 206.

The second waveguide tier 114 is formed (e.g., delimited) by the pair of second upper surfaces 104c of the semiconductor waveguide layer 104 and a pair of second sidewalls 104d of the semiconductor waveguide layer 104. The third waveguide tier 202 is formed (e.g., delimited) by a pair of third upper surfaces 104e of the semiconductor waveguide layer 104. The third upper surfaces 104e are below the second upper surfaces 104c and on opposite sides of the second upper surfaces 104c. The third upper surfaces 104e extend laterally from the second sidewalls 104d.

The conductive heater layer 108 has a pair of third heater tiers 204 below the pair of second heater tiers 118. The pair of third heater tiers 204 are disposed at the second height 122, over the third waveguide tier 202, and on opposite sides of the second waveguide tier 114. For example, pair of third heater tiers 204 are below the pair of second upper surfaces 104c of the semiconductor waveguide layer 104 on opposite sides of the pair of second upper surfaces 104c. The third heater tiers 204 extend laterally away from the second sidewalls 104d of the semiconductor waveguide layer 104. The third heater tiers 204 are formed (e.g., delimited), at least in part, by a pair of third upper surfaces 108g and a pair of third lower surfaces 108h of the conductive heater layer 108.

The conductive heater layer 108 extends vertically alongside the second sidewalls 104d of the semiconductor waveguide layer 104 from the second heater tiers 118 to the third heater tiers 204, respectively. In particular, a second pair of inner sidewalls 108i of the conductive heater layer 108 extend from the second lower surfaces 108d to the third lower surfaces 108h. A first pair of outer sidewalls 108j of the conductive heater layer 108 extend from the second upper surfaces 108c to the third upper surfaces 108g.

By having multiple waveguide tiers over the waveguide base (e.g., by having the second waveguide tier 114 and the first waveguide tier 112 over the third waveguide tier 202), a performance of the optical waveguide may be improved. For example, when the waveguide has multiple tiers over the base of the waveguide, an optical mode of optical radiation traveling through the optical waveguide may have reduced exposure to the sidewalls (e.g., first sidewalls 104b and second sidewalls 104d) of the waveguide. As a result, optical radiation loss along the waveguide may be reduced. In addition, because the conductive heater layer 108 has the third heater tier 204 over the third waveguide tier 202, a control of the temperature of the third waveguide tier 202 may be improved. As a result, a performance of the waveguide may be improved.

Figure 2B:
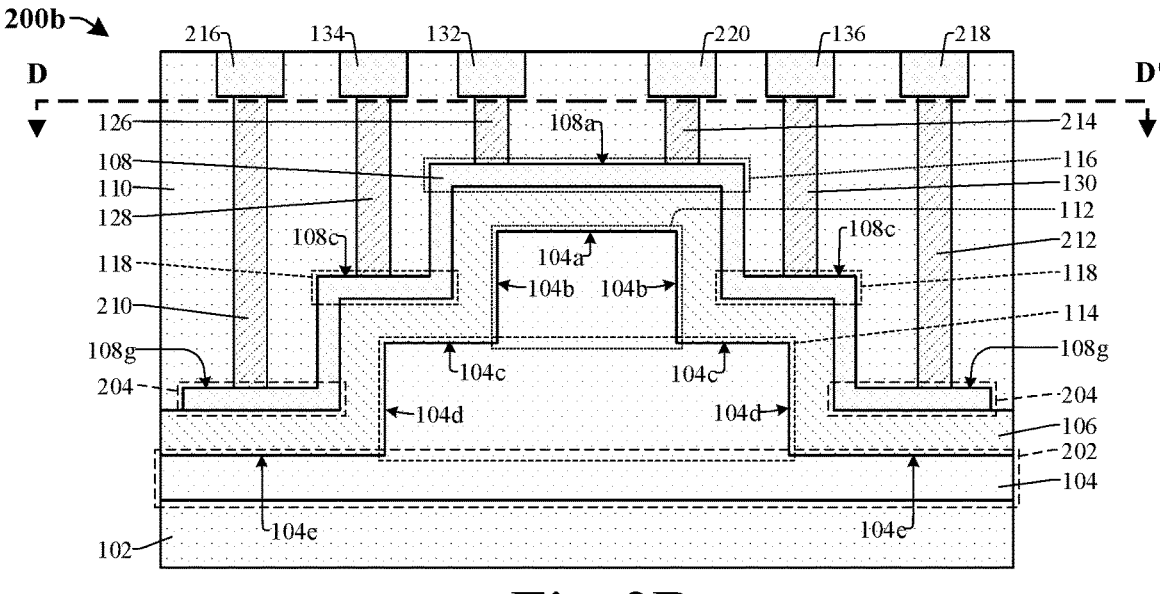
Figure 2C:
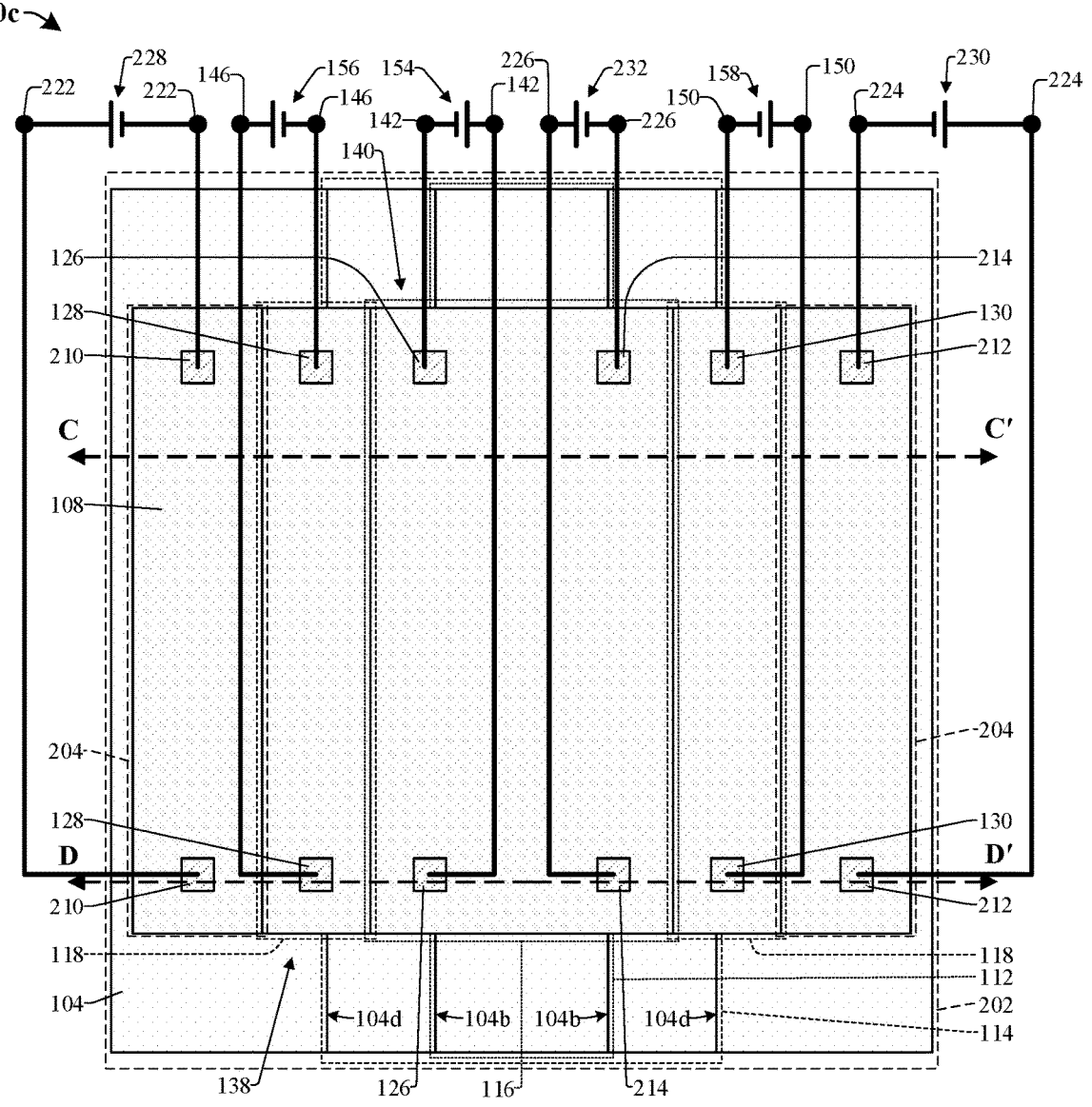
FIG. 2C illustrates a top view of some embodiments of the integrated chip of FIG. 2A and FIG. 2B.

FIG. 2B illustrates another cross-sectional view 200b of some embodiments of the integrated chip of FIG. 2A. In some embodiments, cross-sectional view 100b of FIG. 2B may be taken across line D-D' of FIG. 2C. FIG. 2C illustrates a top view 200c of some embodiments of the integrated chip of FIG. 2A and FIG. 2B. The cladding layer 106 and the first upper dielectric layer 110 are not shown in FIG. 2C.

A pair of fourth contacts 210 and a pair of fifth contacts 212 contact the conductive heater layer 108 along the pair of third heater tiers 204 near opposite ends of the conductive heater layer 108. For example, one of the fourth contacts 210 contacts the conductive heater layer 108 along one of the pair of third upper surfaces 108g of the conductive heater layer 108 near the first end 138 of the conductive heater layer 108. The other of the fourth contacts 210 contacts the conductive heater layer 108 along the one of the pair of third upper surfaces 108g of the conductive heater layer 108 near the second end 140 of the conductive heater layer 108. One of the fifth contacts 212 contacts the conductive heater layer 108 along the other of the pair of third upper surfaces 108g of the conductive heater layer 108 near the first end 138 of the conductive heater layer 108. The other of the fifth contacts 212 contacts the conductive heater layer 108 along the other of the pair of third upper surfaces 108g of the conductive heater layer 108 near the second end 140 of the conductive heater layer 108.

The pair of fourth contacts 210 are coupled to a pair of fourth voltage inputs 222. The pair of fifth contacts 212 are coupled to a pair of fifth voltage inputs 224. The pair of fourth voltage inputs 222 are adapted to be coupled to a fourth voltage supply 228 and the pair of fifth voltage inputs 224 are adapted to be coupled to a fifth voltage supply 230.

In some embodiments, a fourth voltage can be provided across the pair of fourth contacts 210 via the pair of fourth voltage inputs 222. Further, a fifth voltage can be provided across the pair of fifth contacts 212 via the pair of fifth voltage inputs 224. Thus, individually controllable voltages can be provided across the third heater tiers 204 to tune the temperature of the conductive heater layer 108 along the third heater tiers 204 and hence tune the temperature of the semiconductor waveguide layer 104 along the different surfaces (e.g., the second sidewalls 104d and the third upper surfaces 104c) of the semiconductor waveguide layer 104.

Top surfaces of the fourth contacts 210 and the fifth contacts 212 are disposed at the common height (not labeled) over the base dielectric layer 102. The fourth contacts 210 and the fifth contacts 212 extend below bottom surfaces of the second contacts 128 and the third contacts 130. For example, the fourth contacts 210 and the fifth contacts 212 extend to a third depth (not labeled) below the topmost surface (not labeled) of the first upper dielectric layer 110, the third depth being greater than the second depth.

In some embodiments, a pair of sixth contacts 214 contact the conductive heater layer 108 along the first heater tier 116 near opposite ends of the conductive heater layer 108. For example, one of the sixth contacts 214 contacts the conductive heater layer 108 along the first upper surface 108a of the conductive heater layer 108 near the first end 138 of the conductive heater layer 108. The other of the sixth contacts 214 contacts the conductive heater layer 108 along the first upper surface 108a of the conductive heater layer 108 near the second end 140 of the conductive heater layer 108. The pair of sixth contacts are laterally spaced apart from the pair of first contacts 126. The pair of sixth contacts 214 are coupled to a pair of sixth voltage inputs 226. The pair of sixth voltage inputs 226 are adapted to be coupled to a sixth voltage supply 232. In some embodiments, a sixth voltage can be provided across the pair of sixth contacts 214 via the pair of sixth voltage inputs 226.

A pair of fourth metal lines 216 are directly over and coupled to the pair of fourth contacts 210. A pair of fifth metal lines 218 are directly over and coupled to the pair of fifth contacts 212. In some embodiments, a pair of sixth metal lines 220 are directly over and coupled to the pair of sixth contacts 214. The metal lines 216, 218, 220 are not shown in FIG. 2C.

Figure 3:
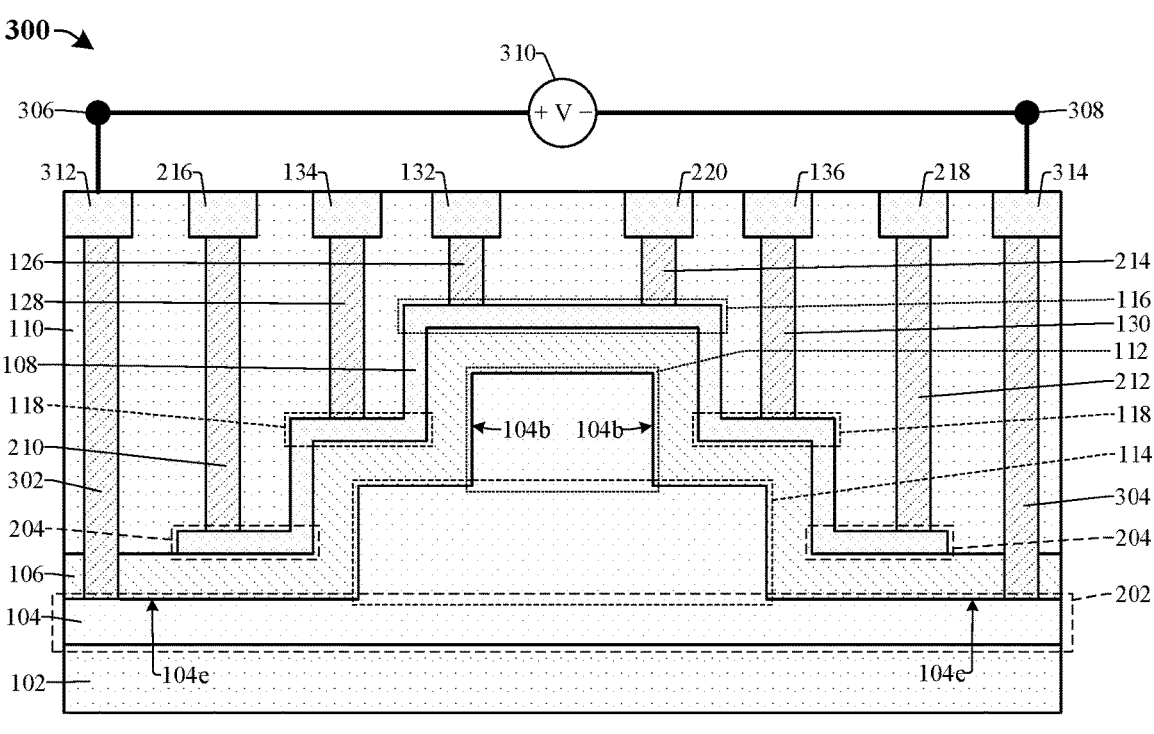
FIG. 3 and FIG. 4 illustrate cross-sectional views of some other embodiments of the integrated chip of FIG. 2B.

FIG. 3 illustrates a cross-sectional view 300 of some embodiments of the integrated chip of FIG. 2B in which a first device contact 302 and a second device contact 304 contact the semiconductor waveguide layer 104 on opposite sides of the conductive heater layer 108.

In some embodiments, the semiconductor waveguide layer 104 is doped to form an active device. For example, in some embodiments, a left side of the semiconductor waveguide layer 104 has a first doping type (e.g., p-type doping) and a right side of the semiconductor waveguide layer 104 has a second doping type (e.g., n-type doping), different than the first doping type. In some embodiments, the region of the semiconductor waveguide layer 104 having the first doping type and the region of the semiconductor waveguide layer 104 having the second doping type meet along a p-n junction in the middle of the semiconductor waveguide layer 104 (e.g., between the first sidewalls 104b), thereby forming a p-n device. In some other embodiments, an intrinsic semiconductor region is arranged between the regions having the doping. For example, the semiconductor waveguide layer 104 has intrinsic doping in the middle of the semiconductor waveguide layer 104 (e.g., between the first sidewalls 104b) between the region having the first doping type (e.g., the left side of the semiconductor waveguide layer 104) and the region having the second doping type (e.g., the right side of the semiconductor waveguide layer 104), thereby forming a p-i-n device.

The first device contact 302 and the second device contact 304 extend through the first upper dielectric layer 110 to the semiconductor waveguide layer 104 on opposite sides of the conductive heater layer 108. In some embodiments, the first device contact 302 and the second device contact 304 contact the semiconductor waveguide layer 104 along the pair of third upper surfaces 104c of the semiconductor waveguide layer 104, respectively. In some embodiments, the dopant concentrations are increased in the third waveguide tier 202 on opposite sides of the second waveguide tier 114 where the device contacts 302, 304 contact the third waveguide tier 202 to improve the performance (e.g., reduce contact resistance) of the active device. A first device metal line 312 is over and coupled to the first device contact 302 and a second device metal line 314 is over and coupled to the second device contact 304.

The first device contact 302 is coupled to a first device voltage input 306 (e.g., a positive voltage input) and the second device contact 304 is coupled to a second device voltage input 308 (e.g., a negative voltage input). In some embodiments, the device voltage inputs 306, 308 may be or comprise solder bumps, bond pads, metal lines, metal contacts, or some other suitable conductive feature(s). The device voltage inputs 306, 308 are adapted to be coupled to a device voltage supply 310. A voltage may be provided across the device contacts 302, 304 via the device voltage inputs 306, 308. Applying the voltage across the device contacts 302, 304 can change the carrier density in the semiconductor waveguide layer 104. By changing the carrier density in the semiconductor waveguide layer 104, the refractive index of the semiconductor waveguide layer 104 can be changed. This may be referred to as the plasma dispersion effect. By changing the refractive index of the semiconductor waveguide layer 104, a phase of the optical radiation passing through the waveguide can be modulated.

Figure 4:
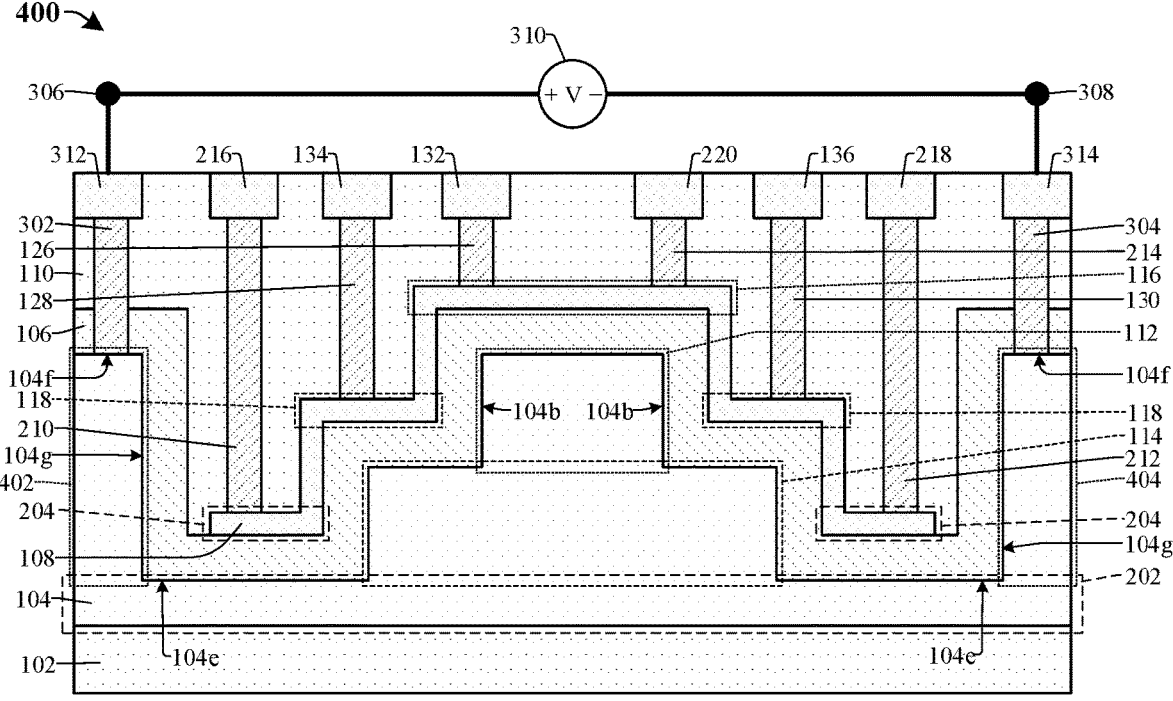

FIG. 4 illustrates a cross-sectional view 400 of some embodiments of the integrated chip of FIG. 3 in which the semiconductor waveguide layer 104 has protrusions 402, 404 under the first device contact 302 and the second device contact 304.

The protrusions 402, 404 protrude upward from the third waveguide tier 202 (e.g., the waveguide base) on opposite sides of the conductive heater layer 108. The protrusions 402, 404 are formed (e.g., delimited), at least in part, by a pair of fourth upper surfaces 104f of the semiconductor waveguide layer and sidewalls 104g. In some embodiments, the semiconductor waveguide layer 104 is heavily doped (e.g., has increased dopant concentrations) at the protrusions 402, 404. The device contacts 302, 304 contact the semiconductor waveguide layer 104 at the protrusions 402, 404. For example, the device contacts 302, 304 contact the fourth upper surfaces 104f of the semiconductor waveguide layer 104.

Figure 5A:
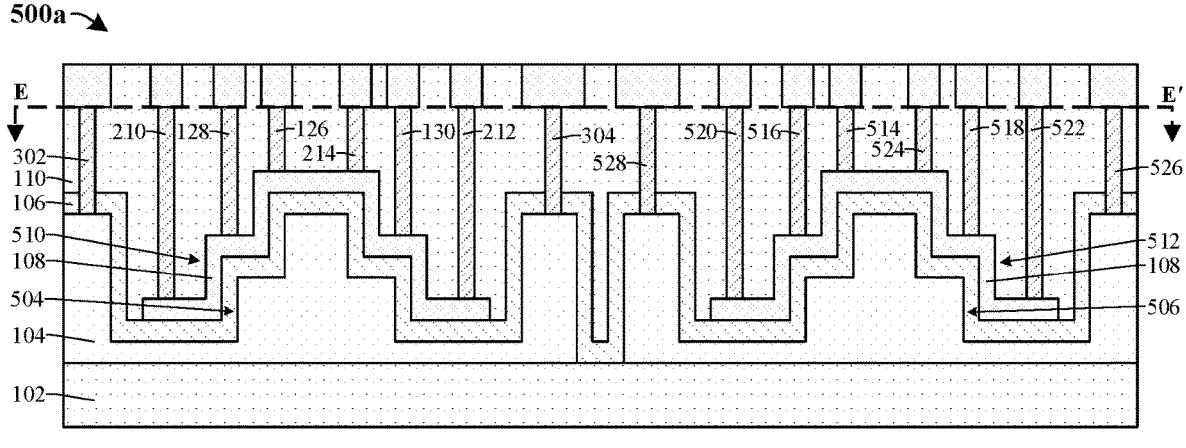
FIG. 5A illustrates a cross-sectional view of some embodiments of an integrated chip in which the multi-tiered semiconductor waveguide layer and the multi-tiered conductive heater layer are implemented in a Mach-Zehnder modulator.
Figure 5B:
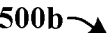
FIG. 5B and FIG. 5C illustrate top views of some embodiments of the integrated chip of FIG. 5A.
Figure 5B:
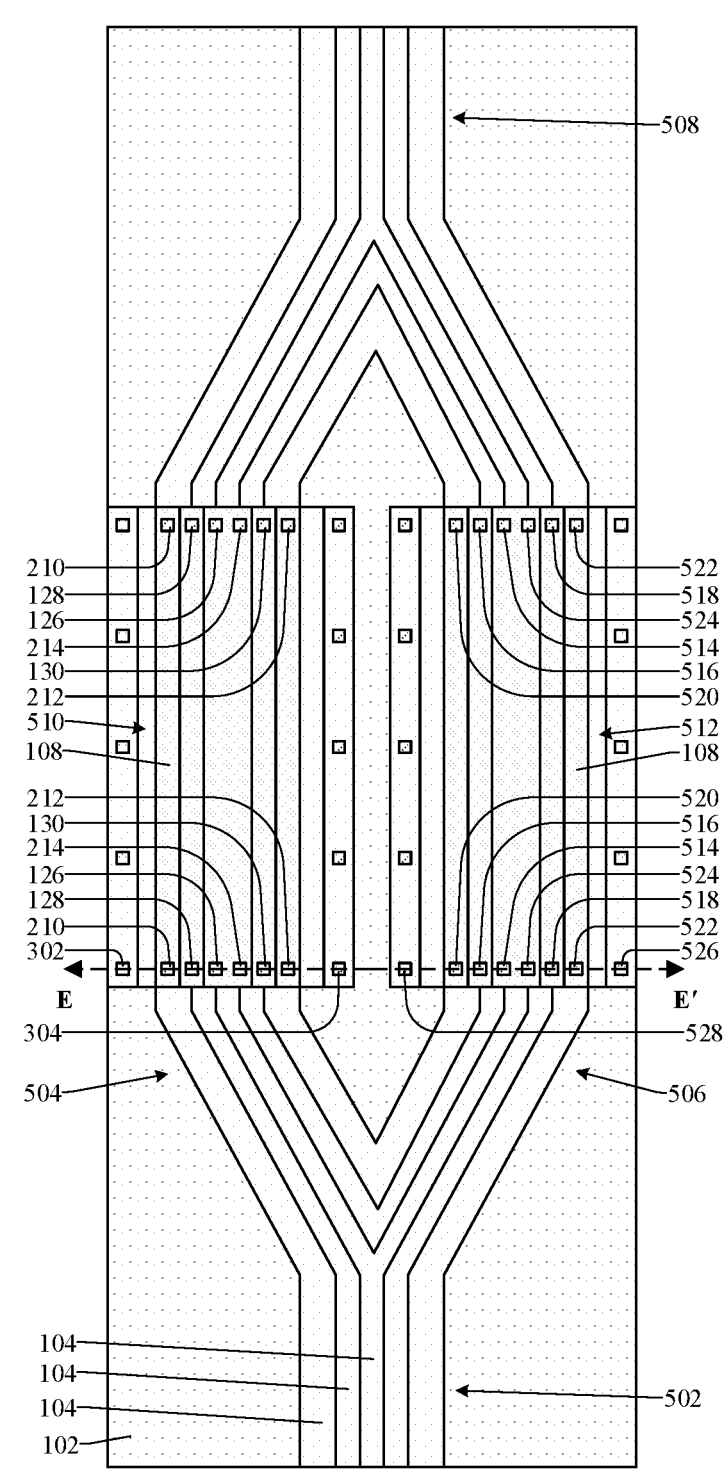
Figure 5C:
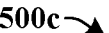
Figure 5C:
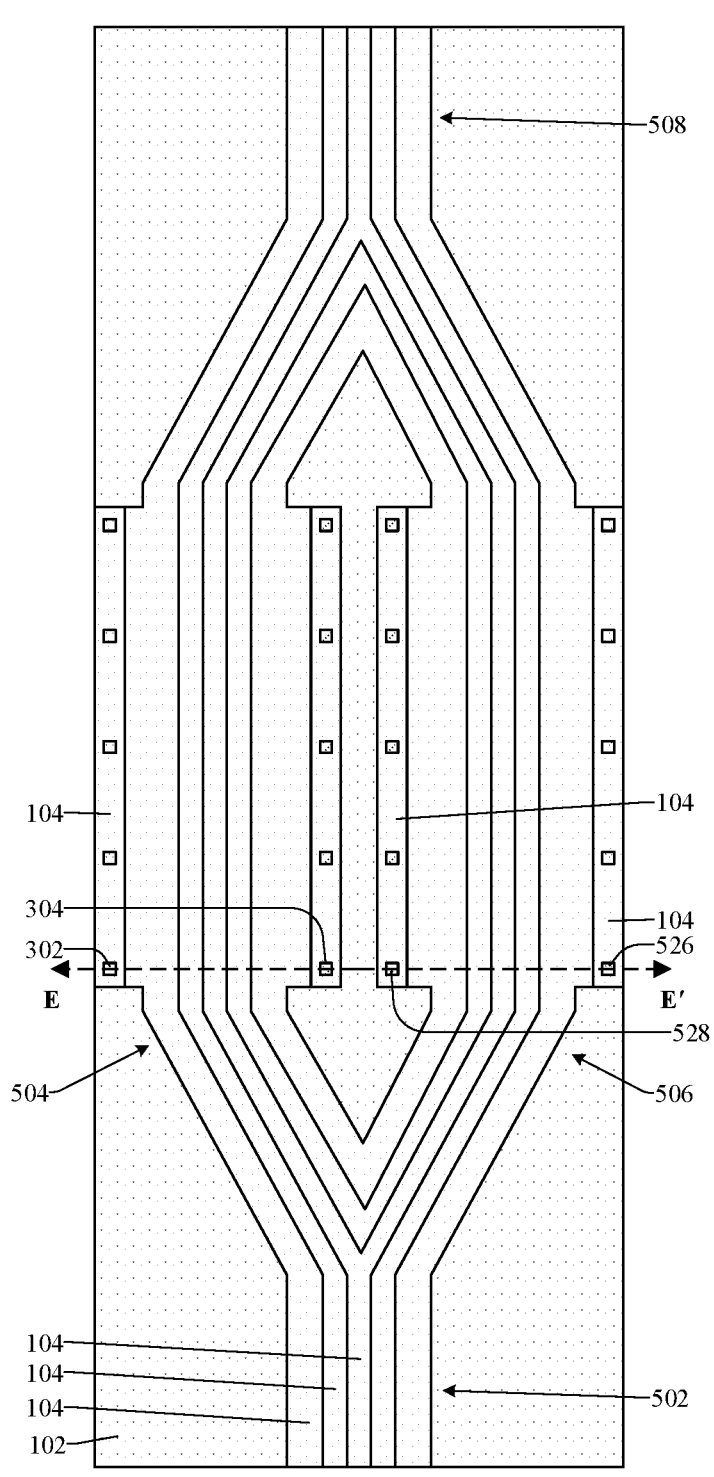

FIG. 5A illustrates a cross-sectional view 500a of some embodiments of an integrated chip in which the multi-tiered semiconductor waveguide layer 104 and the multi-tiered conductive heater layer 108 are implemented in a Mach-Zehnder modulator. FIG. 5B illustrates a first top view 500b of some embodiments of the integrated chip of FIG. 5A. FIG. 5C illustrates a second top view 500c of some embodiments of the integrated chip of FIG. 5A. The conductive heater layer 108 is shown in FIG. 5B but not in FIG. 5C. In some embodiments, cross-sectional view 500a of FIG. 5A may be taken across line E-E' of FIGS. 5B and 5C. The cladding layer 106 and the first upper dielectric layer 110 are not shown in FIGS. 5B and 5C.

The waveguide splits from an input path 502 into a first branch 504 and a second branch 506. The waveguide then recombines into an output path 508. In some embodiments, the conductive heater layer 108 is over one of the branches 504, 506. In some other embodiments, the conductive heater layer 108 is over both of the branches 504, 506. For example, in some embodiments, the conductive heater layer 108 forms a first heater 510 over the first branch 504 and a second heater 512, separate from the first heater 510, over the second branch 506.

Modulation (e.g., phase modulation) can be performed at one or both of the branches 504, 506 by applying a voltage across the waveguide at the branches 504, 506 (e.g., by contacts 302, 304 and by contacts 526, 528, respectively). Further, phase shifting can be performed at one or both of the branches by controlling the temperature of the semiconductor waveguide layer 104 using the conductive heater layer 108. For example, the temperature of the waveguide at one or both of the branches 504, 506 can be adjusted to tune the phase of the modulated optical signal at the branches 504, 506. Because the multi-tiered conductive heater 108 can improve the control of the temperature of the semiconductor waveguide layer 104 at the branches 504, 506, the precision of the phase shifting performed at the branches 504, 506 using the conductive heater layer 108 can be improved. As a result, hence higher order modulation (e.g., four-level pulse amplitude modulation (PAM), eight-level PAM, or the like) may be achievable at the branches 504, 506.

In some embodiments, the temperatures of each of the heaters 510, 512 can be individually controlled. For example, the first heater 510 can be coupled to a first plurality of voltage inputs (e.g., voltage inputs 142, 146, 150, 222, 224, 226) via a first plurality of contacts (e.g., contacts 126, 128, 130, 210, 212, 214) and the second heater 512 can be coupled to a second plurality of voltage inputs (not shown) by a second plurality of contacts (e.g., contacts 514, 516, 518, 520, 522, 524). Thus, current generated in the heaters 510, 512 can be individually controlled and hence the temperature of the heaters 510, 512 can be individually controlled. As a result, the temperature of the waveguide at the different branches 504, 506 can be individually controlled and hence the phase of the optical signals traveling within the branches 504, 506 can be individually tuned.

Figure 6A:
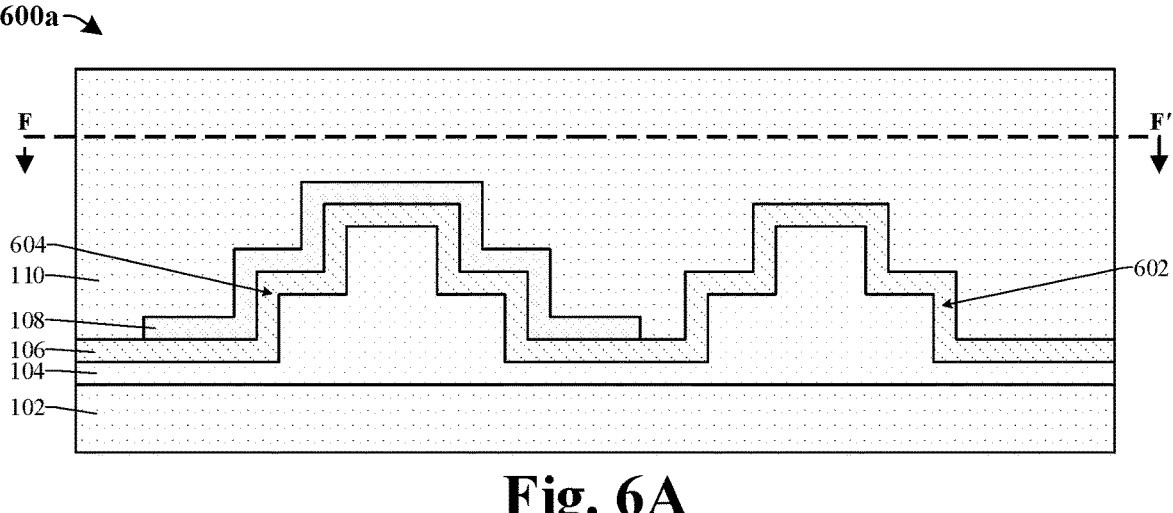
FIG. 6A and FIG. 6B illustrate cross-sectional views of some embodiments of an integrated chip in which the multi-tiered semiconductor waveguide layer and the multi-tiered conductive heater layer are implemented in a micro-ring modulator.
Figure 6B:
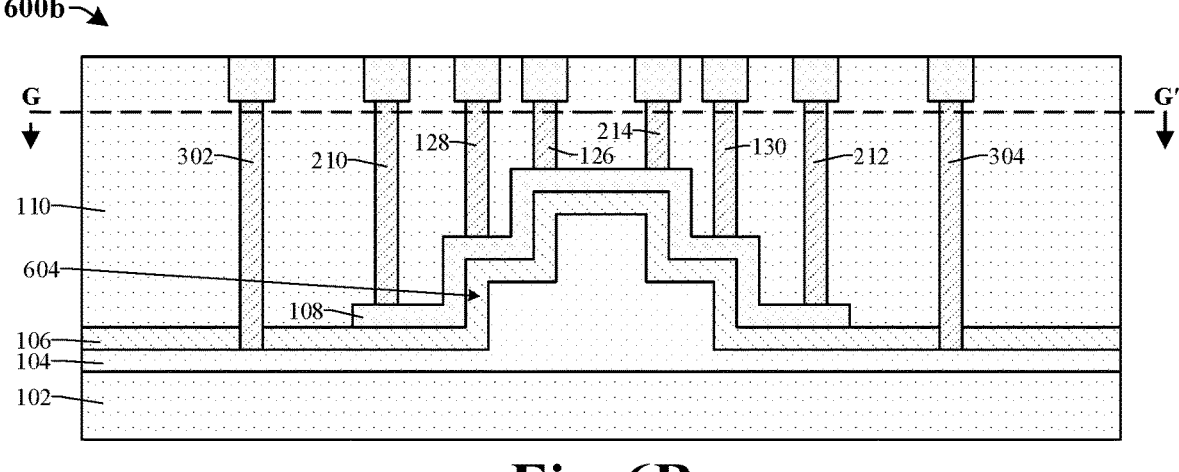
Figure 6C:
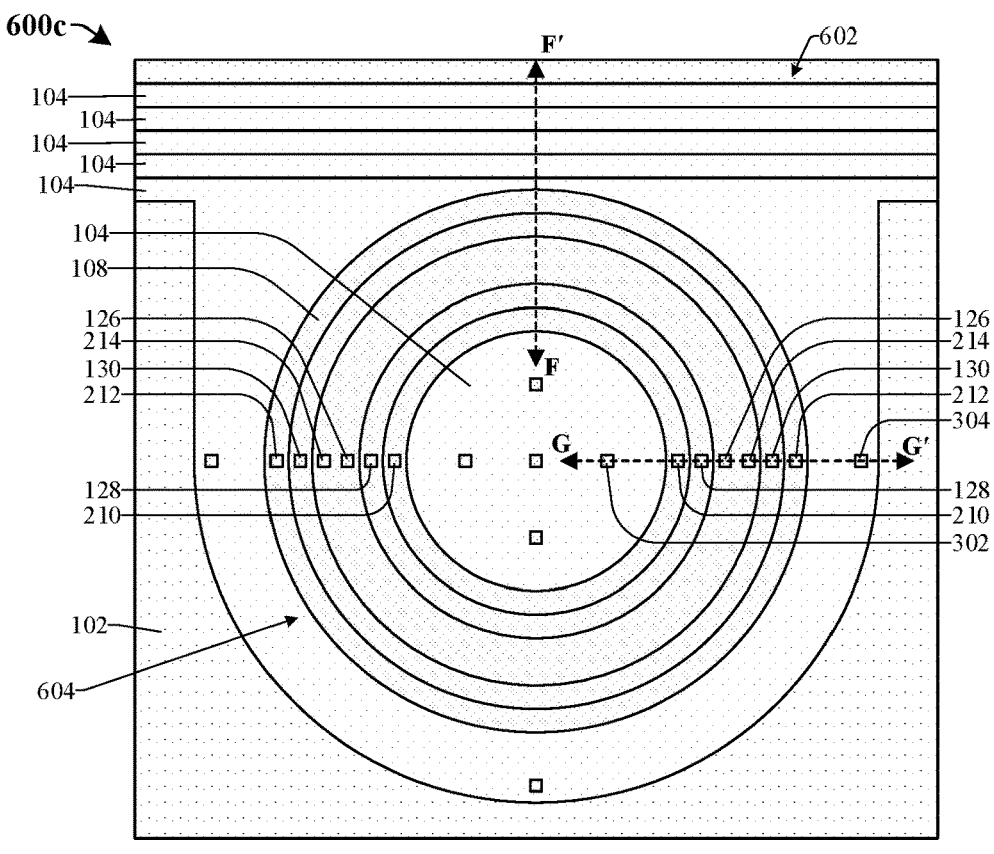
FIG. 6C and FIG. 6D illustrate top views of some embodiments of the integrated chip of FIGS. 6A and 6B.
Figure 6D:
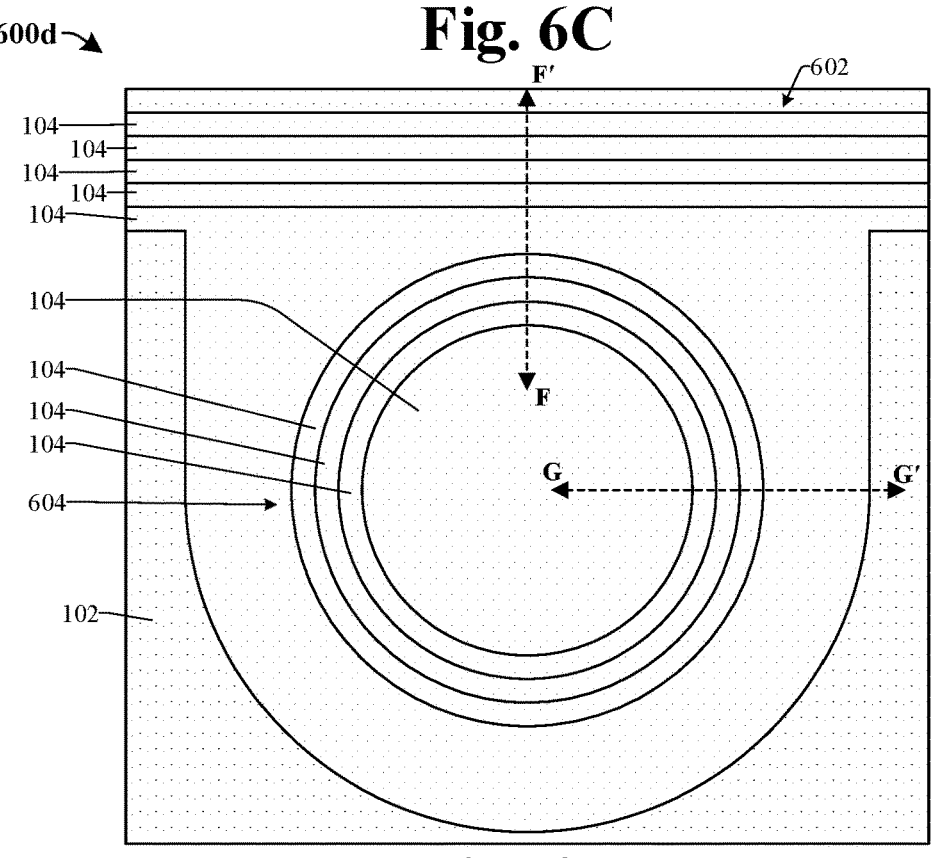

FIG. 6A illustrates a cross-sectional view 600a of some embodiments of an integrated chip in which the multi-tiered semiconductor waveguide layer 104 and the multi-tiered conductive heater layer 108 are implemented in a micro-ring modulator. FIG. 6B illustrates another cross-sectional view 600b of some embodiments of the integrated chip of FIG. 6A. FIG. 6C illustrates a first top view 600c of some embodiments of the integrated chip of FIGS. 6A and 6B. FIG. 6D illustrates a second top view 600d of some embodiments of the integrated chip of FIGS. 6A and 6B. The conductive heater layer 108 is shown in FIG. 6C but not in FIG. 6D. In some embodiments, cross-sectional view 600a of FIG. 6A may be taken across line F-F' of FIGS. 6C and 6D. In some embodiments, cross-sectional view 600b of FIG. 6B may be taken across line G-G' of FIGS. 6C and 6D. The cladding layer 106 and the first upper dielectric layer 110 are not shown in FIGS. 6C and 6D.

The waveguide includes a transmission path 602 (e.g., a bus waveguide) and a micro-ring 604 (e.g., a micro-ring waveguide). The conductive heater layer 108 is arranged over the micro-ring 604 to adjust temperature of the waveguide at the micro-ring 604 and thus control a phase of the optical radiation traveling within the micro-ring 604. By including the multi-tiered conductive heater layer 108 over the micro-ring 604, a control of the temperature of the waveguide at the micro-ring 604 may be improved. As a result, a control of the resonance wavelength of the micro-ring 604 can be improved.

FIGS. 7-18 illustrate cross-sectional views 700-1800 of some embodiments of a method for forming an integrated chip comprising a multi-tiered semiconductor waveguide and a multi-tiered conductive heater over the multi-tiered semiconductor waveguide. Although FIGS. 7-18 are described in relation to a method, it will be appreciated that the structures disclosed in FIGS. 7-18 are not limited to such a method, but instead may stand alone as structures independent of the method.

Figure 7:
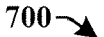
FIGS. 7-18 illustrate cross-sectional views of some embodiments of a method for forming an integrated chip comprising a multi-tiered semiconductor waveguide and a multi-tiered conductive heater over the multi-tiered semiconductor waveguide.
Figure 7:
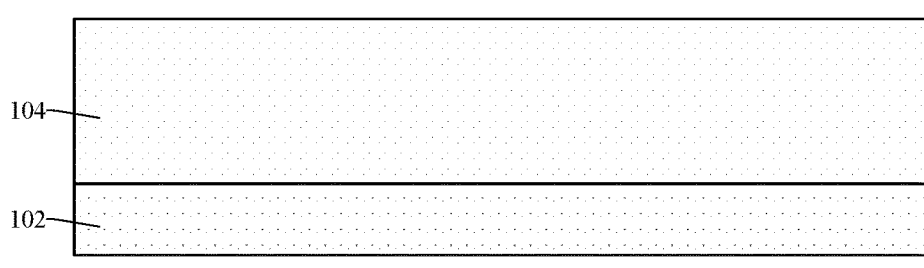

As shown in cross-sectional view 700 of FIG. 7, a semiconductor waveguide layer 104 and a base dielectric layer 102 are provided. The semiconductor waveguide layer 104 is over the base dielectric layer 102. In some embodiments, the base dielectric layer 102 comprises silicon dioxide or some other suitable material. In some embodiments, the semiconductor waveguide layer 104 comprises silicon or some other suitable material.

In some embodiments, the base dielectric layer 102 is over a semiconductor substrate (not shown). The semiconductor substrate, the base dielectric layer 102, and the semiconductor waveguide layer 104 are provided as a semiconductor-on-insulator (SOI) substrate. In some other embodiments, the semiconductor waveguide layer 104 is formed over the base dielectric layer 102 by an epitaxial growth process or some other suitable process.

Figure 8:
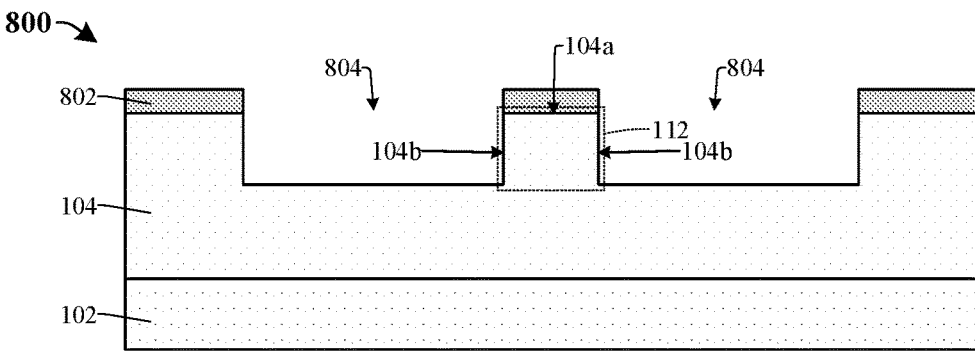

As shown in cross-sectional view 800 of FIG. 8, a hard mask layer 802 is formed over the semiconductor waveguide layer 104 and the semiconductor waveguide layer 104 is etched according to the hard mask layer 802. The etching forms a pair of recesses 804 in the semiconductor waveguide layer 104 and the etching forms (e.g., delimits) a first waveguide tier 112 between the pair of recesses 804.

In some embodiments, the hard mask layer 802 comprises silicon nitride or some other suitable material. In some embodiments, the hard mask layer 802 is formed by depositing the hard mask layer over the semiconductor waveguide layer 104 and patterning the hard mask layer 802 according to a mask (not shown). In some embodiments, the etching comprises a dry etching process such as, for example, a plasma etching process, a reactive ion etching process, an ion beam etching process, or some other suitable process.

Figure 9:
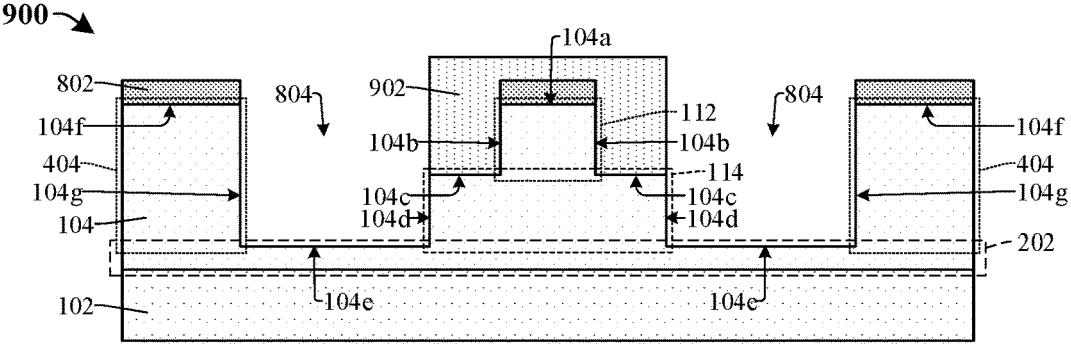

As shown in cross-sectional view 900 of FIG. 9, the semiconductor waveguide layer 104 is etched to form (e.g., delimit) a second waveguide tier 114 below the first waveguide tier 112 and a third waveguide tier 202 below the second waveguide tier 114. In some embodiments, the etching forms (e.g., delimits) protrusions 402, 404 over peripheral portions of the third waveguide tier 202.

In some embodiments, the etching is performed according to a photoresist mask 902 and the hard mask layer 802. In some embodiments, the etching comprises a dry etching process or some other suitable process. In some embodiments, the photoresist mask 902 and the hard mask layer 802 are removed during and/or after the etching.

Figure 10:
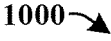
Figure 10:
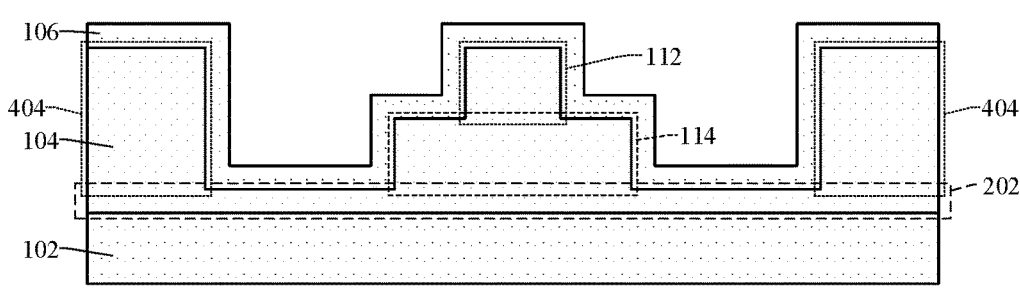

As shown in cross-sectional view 1000 of FIG. 10, a cladding layer 106 is conformally deposited over the semiconductor waveguide layer 104. In some embodiments, the cladding layer 106 comprises silicon dioxide or some other suitable material. In some embodiments, the cladding layer 106 is deposited by a chemical vapor deposition (CVD) process, a physical vapor deposition (PVD) process, an atomic layer deposition (ALD) process, or some other suitable process.

Figure 11:
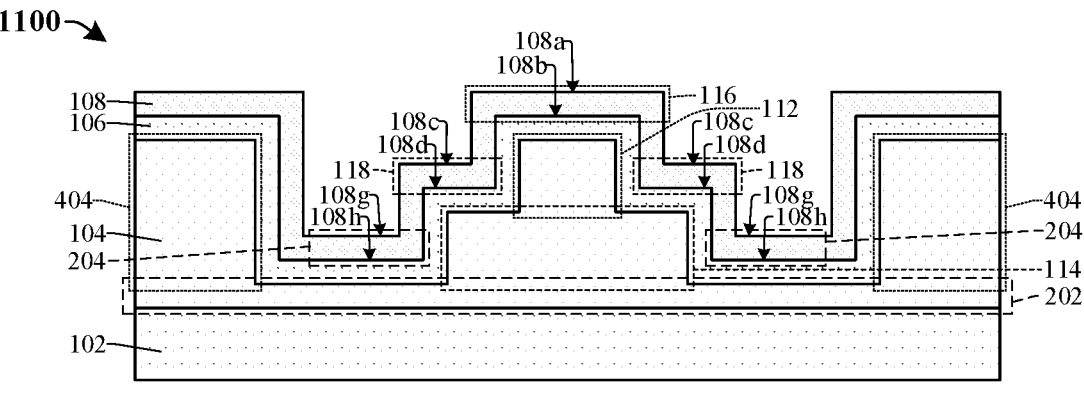

As shown in cross-sectional view 1100 of FIG. 11, a conductive heater layer 108 is conformally deposited over the cladding layer 106. In some embodiments, the conductive heater layer 108 comprises tungsten, titanium nitride, or some other suitable material. In some embodiments, the conductive heater layer 108 is deposited by a chemical vapor deposition CVD process, a physical vapor deposition PVD process, an atomic layer deposition ALD process, or some other suitable process.

By conformally depositing the cladding layer 106 and the conductive heater layer 108 over the semiconductor waveguide layer 104 having the multi-tiered structure (e.g., having a multi-step profile), the cladding layer 106 and the conductive heater layer 108 have multi-tiered structures (e.g., multi-step profiles) similar to the multi-tiered structure of the underlying waveguide. For example, the conductive heater layer 108 has a first heater tier 116 over the first waveguide tier 112, a pair of second heater tiers 118 over the second waveguide tier 114 and on opposite sides of the first waveguide tier 112, and a pair of third heater tiers 204 over the third waveguide tier 202 and on opposite sides of the second waveguide tier 114. By forming the conductive heater layer 108 to have the multi-tiered structure, a control of the temperature of the semiconductor waveguide layer 104 may be improved and hence a performance of the waveguide may be improved.

Figure 12:
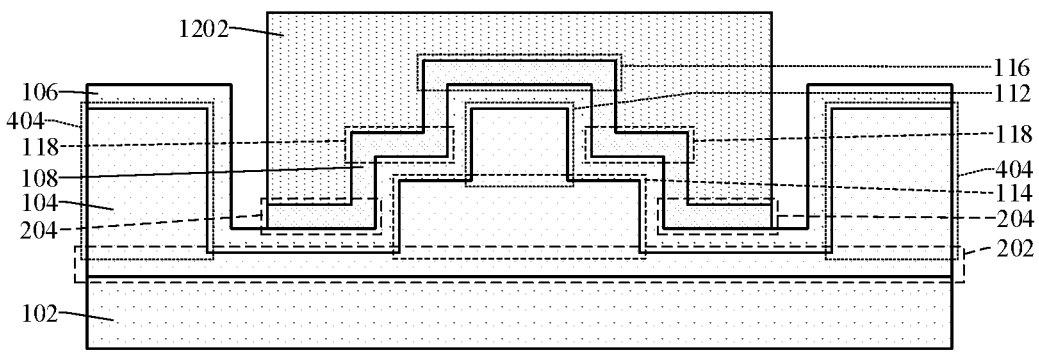

As shown in cross-sectional view 1200 of FIG. 12, the conductive heater layer 108 is etched to further form (e.g., delimit) the conductive heater layer 108. In some embodiments, etching the conductive heater layer 108 removes the conductive heater layer 108 from over the protrusions 402, 404. In some embodiments, the etching is performed according to a photoresist mask 1202. In some embodiments, the etching comprises a dry etching process or some other suitable process. In some embodiments, the photoresist mask 1202 is removed during and/or after the etching.

Figure 13:
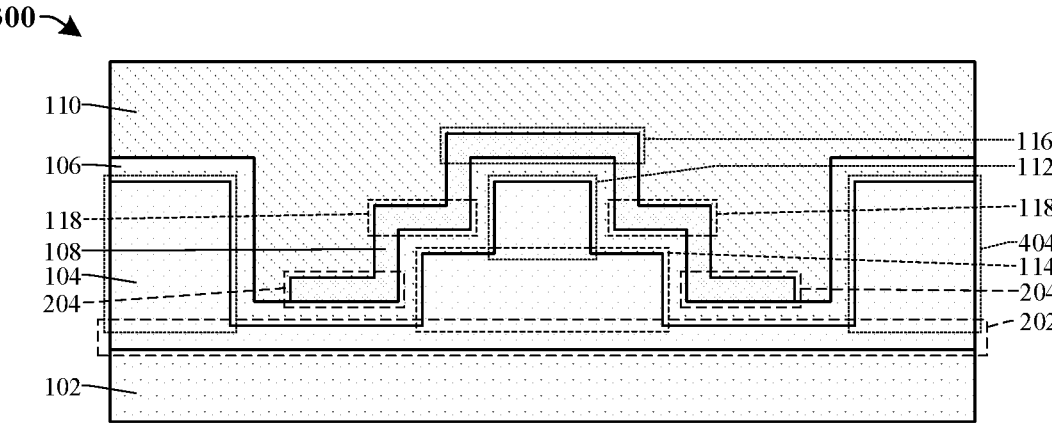

As shown in cross-sectional view 1300 of FIG. 13, a first upper dielectric layer 110 is deposited over the cladding layer 106 and the conductive heater layer 108. In some embodiments, the first upper dielectric layer 110 comprises silicon dioxide or some other suitable material. In some embodiments, the first upper dielectric layer 110 is deposited by a CVD process, a physical vapor deposition PVD process, an atomic layer deposition ALD process, or some other suitable process.

Figure 14:
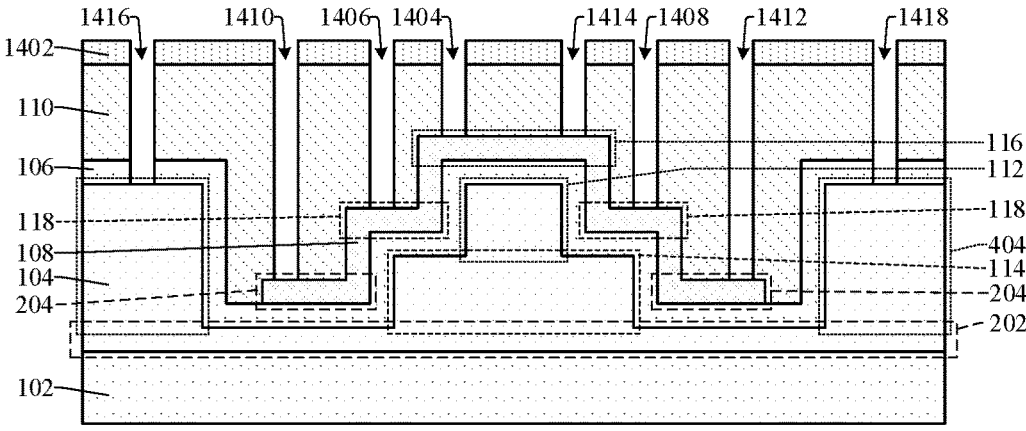

As shown in cross-sectional view 1400 of FIG. 14, the first upper dielectric layer 110 and the cladding layer 106 are etched to form contact openings 1404, 1406, 1408, 1410, 1412, 1416, 1418 in the first upper dielectric layer 110 and the cladding layer 106. The etching extends through the first upper dielectric layer 110 and the cladding layer 106 to different depths below a topmost surface of the first upper dielectric layer 110 so that the contact openings 1404 uncover upper surfaces of the conductive heater layer 108 at each of the tiers of the conductive heater layer 108.

In some embodiments, the etching is performed according to a photoresist mask 1402. In some embodiments, the etching comprises a dry etching process or some other suitable process. In some embodiments, the photoresist mask 1402 is removed during and/or after the etching.

Figure 15:
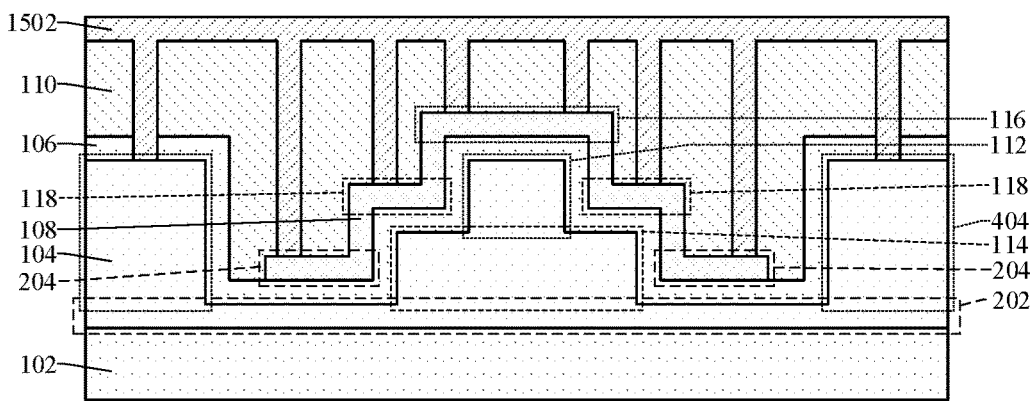

As shown in cross-sectional view 1500 of FIG. 15, a contact layer 1502 is deposited over the first upper dielectric layer 110 and in the contact openings 1404, 1406, 1408, 1410, 1412, 1416, 1418. In some embodiments, the contact layer 1502 comprises tungsten or some other suitable material. In some embodiments, the contact layer 1502 is deposited by a chemical vapor deposition CVD process, a physical vapor deposition PVD process, an atomic layer deposition ALD process, or some other suitable process.

Figure 16:
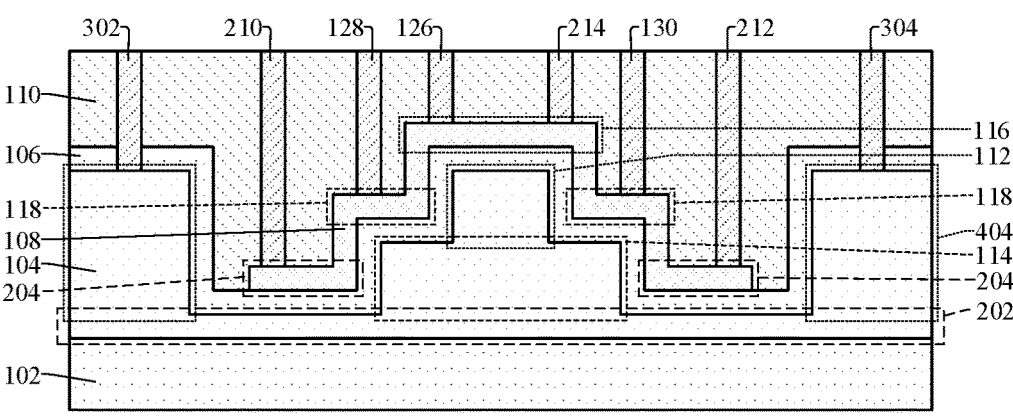

As shown in cross-sectional view 1600 of FIG. 16, a planarization process is performed on the contact layer 1502 to form individual contacts 126, 128, 130, 210, 212, 214, 302, 304 from the contact layer 1502 in the contact openings 1404, 1406, 1408, 1410, 1412, 1416, 1418, respectively. In some embodiments, the planarization process includes a chemical mechanical planarization (CMP) or some other suitable process.

By forming individual (e.g., separate) contacts on the individual tiers of the conductive heater layer 108, the control of the temperature of the conductive heater layer 108 may be improved and hence the control of the temperature of the semiconductor waveguide layer 104 may be improved.

Figure 17:
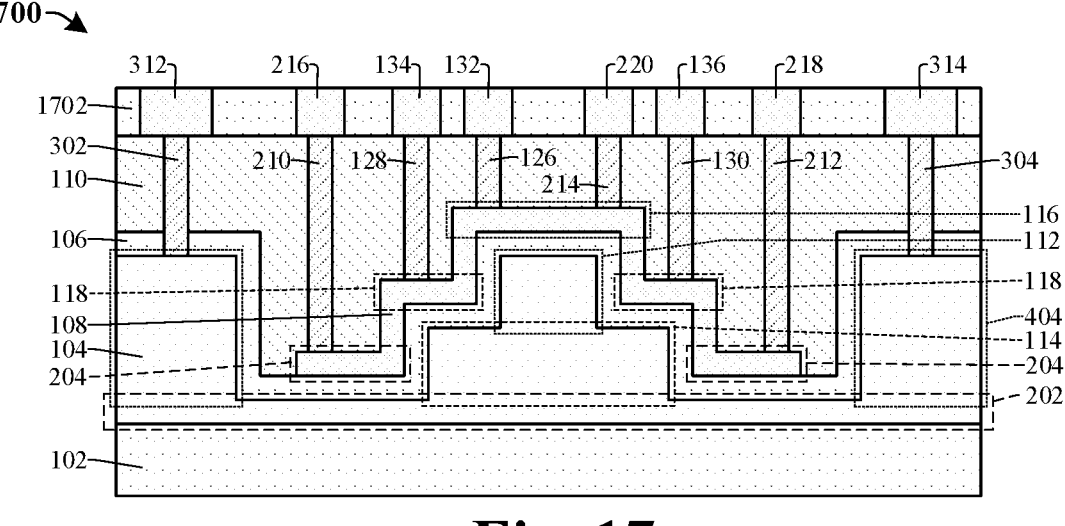

As shown in cross-sectional view 1700 of FIG. 17, a second upper dielectric layer 1702 is deposited over the first upper dielectric layer 110 and over the contacts. In addition, metal lines (e.g., metal lines 132, 134, 136, 216, 218, 220, 312, 314) are formed in the second upper dielectric layer 1702 and over the contacts, respectively.

In some embodiments, the second upper dielectric layer 1702 comprises silicon dioxide or some other suitable material. In some embodiments, the second upper dielectric layer 1702 is deposited by a chemical vapor deposition CVD process, a physical vapor deposition PVD process, an atomic layer deposition ALD process, or some other suitable process.

In some embodiments, the second upper dielectric layer 1702 is etched (e.g., using a dry etching process or some other suitable process) to form metal line openings (not shown) in the second upper dielectric layer 1702 directly over the contacts. A metal layer (e.g., a layer comprising copper or some other suitable material) is subsequently deposited over the second upper dielectric layer 1702 and in the metal line openings. A planarization process (e.g., a CMP or some other suitable process) may be subsequently performed on the metal layer to form (e.g., delimit) the individual metal lines from the metal layer.

Figure 18:
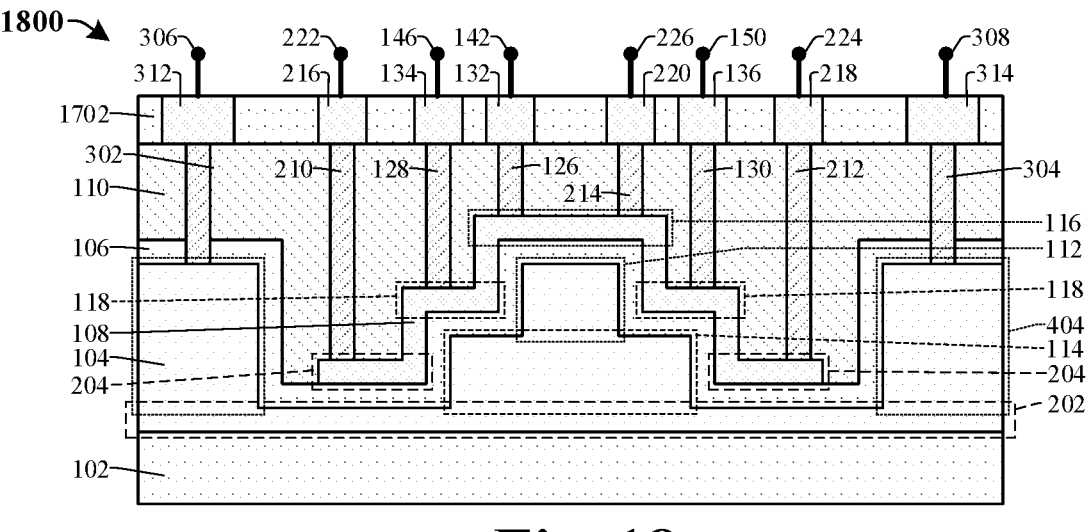

As shown in cross-sectional view 1800 of FIG. 18, voltage inputs (e.g., the first pair of voltage inputs 142, the second pair of voltage inputs 146, the third pair of voltage inputs 150, the first device voltage input 306, and the second device voltage input 308) are formed over the contacts and coupled to the contacts (e.g., via the metal lines). The voltage inputs are adapted to be coupled to individual voltage supplies (not shown), respectively. The voltage inputs may be or comprise a number of conductive features. For example, in some embodiments, the voltage inputs may be or comprise solder bumps, bond pads, metal lines, metal contacts, or some other suitable conductive feature(s).

FIG. 19 illustrates a flow diagram of some embodiments of a method 1900 for forming an integrated chip comprising a multi-tiered semiconductor waveguide and a multi-tiered conductive heater over the multi-tiered semiconductor waveguide. While method 1900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At block 1902, a semiconductor waveguide layer is provided. FIG. 7 illustrates a cross-sectional view 700 of some embodiments corresponding to block 1902.

At block 1904, etch the semiconductor waveguide layer to form a multi-tiered semiconductor waveguide from the semiconductor waveguide layer. FIG. 8 and FIG. 9 illustrate a cross-sectional view 800 and a cross-sectional view 900, respectively, of some embodiments corresponding to block 1904.

At block 1906, deposit a cladding layer conformally over the multi-tiered semiconductor waveguide. FIG. 10 illustrates a cross-sectional view 1000 of some embodiments corresponding to block 1906.

At block 1908, deposit a conductive heater layer conformally over the cladding layer to form a multi-tiered conductive heater over the multi-tiered semiconductor waveguide. FIG. 11 illustrates a cross-sectional view 1100 of some embodiments corresponding to block 1908.

At block 1910, etch the conductive heater layer to further form the multi-tiered conductive heater. FIG. 12 illustrates a cross-sectional view 1200 of some embodiments corresponding to block 1910.

At block 1912, deposit an upper dielectric layer over the multi-tiered conductive heater. FIG. 13 illustrates a cross-sectional view 1300 of some embodiments corresponding to block 1912.

At block 1914, etch the upper dielectric layer and the cladding layer to form contact openings over different tiers of the multi-tiered conductive heater. FIG. 14 illustrates a cross-sectional view 1400 of some embodiments corresponding to block 1914.

At block 1916, deposit a contact layer over the upper dielectric layer and in the contact openings to form contacts on the different tiers of the multi-tiered conductive heater. FIG. 15 and FIG. 16 illustrate a cross-sectional view 1500 and a cross-sectional view 1600, respectively, of some embodiments corresponding to block 1916.

At block 1918, form voltage inputs over the contacts and coupled to the contacts. FIG. 18 illustrates a cross-sectional view 1800 of some embodiments corresponding to block 1918.

Thus, the present disclosure relates to an integrated chip and a method for forming the integrated chip, the integrated chip including a multi-tiered conductive heater layer over a multi-tiered semiconductor waveguide layer.

Accordingly, in some embodiments, the present disclosure relates to an integrated chip including a base dielectric layer and a multi-tiered semiconductor waveguide layer over the base dielectric layer. The multi-tiered semiconductor waveguide layer has a first waveguide tier having a first width at a first height over the base dielectric layer. The multi-tiered semiconductor waveguide layer has a second waveguide tier having a second width, greater than the first width, at a second height, less than the first height, over the base dielectric layer. A cladding layer is over the multi-tiered semiconductor waveguide layer. A multi-tiered conductive heater layer is over the cladding layer. The multi-tiered conductive heater layer has a first heater tier over the first waveguide tier. The multi-tiered conductive heater layer has a pair of second heater tiers at the first height, over the second waveguide tier, and on opposite sides of the first waveguide tier.

In other embodiments, the present disclosure relates to an integrated chip including a base dielectric layer and a multi-tiered semiconductor waveguide layer over the base dielectric layer. The multi-tiered semiconductor waveguide layer has a first waveguide tier having a first width at a first height over the base dielectric layer, a second waveguide tier having a second width, greater than the first width, at a second height, less than the first height, over the base dielectric layer, and a third waveguide tier having a third width, greater than the second width, at a third height, less than the second height, over the base dielectric layer. A cladding layer conformally overlies the multi-tiered semiconductor waveguide layer. A multi-tiered conductive heater layer conformally overlies the cladding layer. The multi-tiered conductive heater layer is spaced apart from the multi-tiered semiconductor waveguide layer by the cladding layer. The multi-tiered conductive heater layer has a first heater tier over the first waveguide tier. The multi-tiered conductive heater layer has a pair of second heater tiers at the first height, over second waveguide tier, and on opposite sides of the first waveguide tier. The multi-tiered conductive heater layer has a pair of third heater tiers at the second height, over the third waveguide tier, and on opposite sides of the second waveguide tier. A pair of first contacts are over and coupled to the multi-tiered conductive heater layer along the first heater tier. A pair of second contacts are over and coupled to the multi-tiered conductive heater layer along one of the pair of second heater tiers. A pair of third contacts are over and coupled to the multi-tiered conductive heater layer along the other of the pair of second heater tiers. A pair of fourth contacts are over and coupled to the multi-tiered conductive heater layer along one of the pair of third heater tiers. A pair of fifth contacts are over and coupled to the multi-tiered conductive heater layer along the other of the pair of third heater tiers.

In yet other embodiments, the present disclosure relates to a method for forming an integrated chip. The method includes etching a semiconductor waveguide layer to form a multi-tiered semiconductor waveguide from the semiconductor waveguide layer. The multi-tiered semiconductor waveguide has a first waveguide tier having a first width at a first height over a base dielectric layer. The multi-tiered semiconductor waveguide has a second waveguide tier having a second width, greater than the first width, at a second height, less than the first height, over the base dielectric layer. A cladding layer is deposited conformally over the multi-tiered semiconductor waveguide. A conductive heater layer is deposited conformally over the cladding layer to form a multi-tiered conductive heater over the cladding layer and the multi-tiered semiconductor waveguide. The multi-tiered conductive heater has a first heater tier over the first waveguide tier. The multi-tiered conductive heater has a pair of second heater tiers at the first height, over second waveguide tier, and on opposite sides of the first waveguide tier. An upper dielectric layer is deposited over the conductive heater layer. The upper dielectric layer is etched to form a first contact opening, a second contact opening, and a third contact opening in the upper dielectric layer. The first contact opening is over the first heater tier. The second contact opening and the third contact opening are over the pair of second heater tiers, respectively. A metal is deposited over the upper dielectric layer and in the first contact opening, the second contact opening, and the third contact opening to form a first contact in the first contact opening, a second contact in the second contact opening, and a third contact in the third contact opening. The first contact is coupled to the multi-tiered conductive heater at the first heater tier. The second contact and the third contact are coupled to the multi-tiered conductive heater at the pair of second heater tiers, respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated chip, comprising:
a base dielectric layer;
a multi-tiered semiconductor waveguide layer over the base dielectric layer, the multi-tiered semiconductor waveguide layer having a first waveguide tier having a first width at a first height over the base dielectric layer, the multi-tiered semiconductor waveguide layer having a second waveguide tier having a second width, greater than the first width, at a second height, less than the first height, over the base dielectric layer, the multi-tiered semiconductor waveguide layer having a third waveguide tier having a third width, greater than the second width, at a third height, less than the second height, over the base dielectric layer;
a cladding layer over the multi-tiered semiconductor waveguide layer; and
a multi-tiered conductive heater layer over the cladding layer, the multi-tiered conductive heater layer having a first heater tier over the first waveguide tier, the multi-tiered conductive heater layer having a pair of second heater tiers at the first height, over the second waveguide tier, and on opposite sides of the first waveguide tier.

2. The integrated chip of claim 1, further comprising:

a first contact over and coupled to the multi-tiered conductive heater layer along the first heater tier;

a second contact coupled to the multi-tiered conductive heater layer along a first of the pair of second heater tiers; and a third contact coupled to the multi-tiered conductive heater layer along a second of the pair of second heater tiers.

3. The integrated chip of claim 2, further comprising:

a first voltage input over and coupled to the first contact;

a second voltage input over and coupled to the second contact; and a third voltage input over and coupled to the third contact.

4. The integrated chip of claim 3, wherein the first voltage input is adapted to be coupled to a first voltage supply, the second voltage input is adapted to be coupled to a second voltage supply, and the third voltage input is adapted to be coupled to a third voltage supply.

5. The integrated chip of claim 1, the multi-tiered conductive heater layer having a pair of third heater tiers at the second height, over the third waveguide tier, and on opposite sides of the second waveguide tier.

6. The integrated chip of claim 1, wherein the cladding layer is directly between the first waveguide tier and the first heater tier and directly between the second waveguide tier and the pair of second heater tiers.

7. An integrated chip, comprising:

a base dielectric layer;

a multi-tiered semiconductor waveguide layer over the base dielectric layer, the multi-tiered semiconductor waveguide layer having a first waveguide tier having a first width at a first height over the base dielectric layer, a second waveguide tier having a second width, greater than the first width, at a second height, less than the first height, over the base dielectric layer, and a third waveguide tier having a third width, greater than the second width, at a third height, less than the second height, over the base dielectric layer;

a cladding layer conformally overlying the multi-tiered semiconductor waveguide layer;

a multi-tiered conductive heater layer conformally overlying the cladding layer, the multi-tiered conductive heater layer spaced apart from the multi-tiered semiconductor waveguide layer by the cladding layer, the multi-tiered conductive heater layer having a first heater tier over the first waveguide tier, the multi-tiered conductive heater layer having a pair of second heater tiers at the first height, over the second waveguide tier, and on opposite sides of the first waveguide tier, and the multi-tiered conductive heater layer having a pair of third heater tiers at the second height, over the third waveguide tier, and on opposite sides of the second waveguide tier;

a pair of first contacts over and coupled to the multi-tiered conductive heater layer along the first heater tier;

a pair of second contacts over and coupled to the multi-tiered conductive heater layer along one of the pair of second heater tiers;

a pair of third contacts over and coupled to the multi-tiered conductive heater layer along the other of the pair of second heater tiers;

a pair of fourth contacts over and coupled to the multi-tiered conductive heater layer along one of the pair of third heater tiers; and a pair of fifth contacts over and coupled to the multi-tiered conductive heater layer along the other of the pair of third heater tiers.

8. The integrated chip of claim 7, wherein the first waveguide tier is formed by a first upper surface and a pair of first sidewalls of the multi-tiered semiconductor waveguide layer, wherein the second waveguide tier is formed by a pair of second upper surfaces and a pair of second sidewalls of the multi-tiered semiconductor waveguide layer, wherein the pair of second upper surfaces are on opposite sides of the first upper surface and below the first upper surface, wherein the third waveguide tier is formed by a pair of third waveguide upper surfaces of the multi-tiered semiconductor waveguide layer, and wherein the pair of third waveguide upper surfaces are on opposite sides of the pair of second upper surfaces and below the pair of second upper surfaces.

9. The integrated chip of claim 8, wherein the first upper surface extends between tops of the pair of first sidewalls, wherein the pair of first sidewalls extend from the first upper surface to the pair of second upper surfaces, respectively, wherein the pair of second upper surfaces extend from bottoms of the pair of first sidewalls to tops of the pair of second sidewalls, respectively, wherein the pair of second sidewalls extend from the pair of second upper surfaces to the pair of third upper surfaces, respectively, and wherein the pair of third upper surfaces extend laterally from bottoms of the pair of second sidewalls, respectively.

10. The integrated chip of claim 8, wherein the first heater tier is formed by a first lower surface of the multi-tiered conductive heater layer, wherein the pair of second heater tiers are formed by a pair of second lower surfaces of the multi-tiered conductive heater layer, wherein the pair of second lower surfaces of the multi-tiered conductive heater layer are below the first upper surface of the multi-tiered semiconductor waveguide layer and directly over the pair of second upper surfaces of the multi-tiered semiconductor waveguide layer, respectively, wherein the pair of third heater tiers are formed by a pair of third lower surfaces of the multi-tiered conductive heater layer, wherein the pair of third lower surfaces of the multi-tiered conductive heater layer are below the pair of second upper surfaces of the multi-tiered semiconductor waveguide layer and directly over the pair of third upper surfaces of the multi-tiered semiconductor waveguide layer, respectively.

11. The integrated chip of claim 10, wherein the multi-tiered conductive heater layer has a first pair of inner sidewalls that extend from the first lower surface of the multi-tiered conductive heater layer to the pair of second lower surfaces of the multi-tiered conductive heater layer, respectively, and wherein the multi-tiered conductive heater layer has a second pair of inner sidewalls that extend from the pair of second lower surfaces of the multi-tiered conductive heater layer to the pair of third lower surfaces of the multi-tiered conductive heater layer, respectively.

12. The integrated chip of claim 7, wherein the pair of first contacts are coupled to a pair of first voltage supply inputs, respectively, the pair of second contacts are coupled to a pair of second voltage supply inputs, respectively, the pair of third contacts are coupled to a pair of third voltage supply inputs, respectively, the pair of fourth contacts are coupled to a pair of fourth voltage supply inputs, respectively, and the pair of fifth contacts are coupled to a pair of fifth voltage supply inputs, respectively.

13. The integrated chip of claim 12, wherein the multi-tiered semiconductor waveguide layer has a pair of protrusions protruding upward from the third waveguide tier on opposite sides of the multi-tiered conductive heater layer.

14. The integrated chip of claim 7, further comprising:

an upper dielectric layer over the multi-tiered conductive heater layer, wherein the pair of first contacts extends through the upper dielectric layer to a first depth below a topmost surface of the upper dielectric layer, wherein the pair of second contacts and the pair of third contacts extend through the upper dielectric layer to a second depth, greater than the first depth, below the topmost surface of the upper dielectric layer, and wherein the pair of fourth contacts and the pair of fifth contacts extend through the upper dielectric layer to a third depth, greater than the second depth, below the topmost surface of the upper dielectric layer.

15. A method for forming an integrated chip, the method comprising:

etching a semiconductor waveguide layer to form a multi-tiered semiconductor waveguide from the semiconductor waveguide layer, the multi-tiered semiconductor waveguide having a first waveguide tier having a first width at a first height over a base dielectric layer, the multi-tiered semiconductor waveguide having a second waveguide tier having a second width, greater than the first width, at a second height, less than the first height, over the base dielectric layer, the multi-tiered semiconductor waveguide having a pair of protrusions protruding upward on opposite sides of the first and second waveguide tiers;

depositing a cladding layer conformally over the multi-tiered semiconductor waveguide;

depositing a conductive heater layer conformally over the cladding layer to form a multi-tiered conductive heater over the cladding layer and the multi-tiered semiconductor waveguide, the multi-tiered conductive heater having a first heater tier over the first waveguide tier, the multi-tiered conductive heater having a pair of second heater tiers at the first height, over the second waveguide tier, and on opposite sides of the first waveguide tier, wherein the pair of protrusions of the multi-tiered semiconductor waveguide are spaced from the multi-tiered conductive heater on opposite sides of the multi-tiered conductive heater;

depositing an upper dielectric layer over the multi-tiered conductive heater;

etching the upper dielectric layer to form a first contact opening, a second contact opening, and a third contact opening in the upper dielectric layer, the first contact opening over the first heater tier, the second contact opening and the third contact opening over the pair of second heater tiers, respectively;

depositing a metal over the upper dielectric layer and in the first contact opening, the second contact opening, and the third contact opening to form a first contact in the first contact opening, a second contact in the second contact opening, and a third contact in the third contact opening, the first contact coupled to the multi-tiered conductive heater at the first heater tier, the second contact and the third contact coupled to the multi-tiered conductive heater at the pair of second heater tiers, respectively; and forming a fourth contact on one of the pair of protrusions of the multi-tiered semiconductor waveguide and coupled to the multi-tiered semiconductor waveguide at the one of the pair of protrusions.

16. The method of claim 15, wherein the etching the semiconductor waveguide layer comprises performing a first etch to form the first waveguide tier and performing a second etch to form the second waveguide tier.

17. The method of claim 15, further comprising:

etching the conductive heater layer after depositing the conductive heater layer to further form the multi-tiered conductive heater.

18. The method of claim 15, further comprising:

forming a first voltage supply input over and coupled to the first contact;

forming a second voltage supply input over and coupled to the second contact; and forming a third voltage supply input over and coupled to the third contact.

19. The method of claim 15, the multi-tiered semiconductor waveguide having a third waveguide tier having a third width, greater than the second width, at a third height, less than the second height, over the base dielectric layer, and the multi-tiered conductive heater having a pair of third heater tiers at the second height, over the third waveguide tier, and on opposite sides of the second waveguide tier.

20. The method of claim 15, wherein the one of the pair of protrusions of the multi-tiered semiconductor waveguide has a top surface at a third height, greater than the second height, over the base dielectric layer.

* * * * *